United States Patent
Brown et al.

(10) Patent No.: US 6,650,694 B1
(45) Date of Patent: Nov. 18, 2003

(54) CORRELATOR CO-PROCESSOR FOR CDMA RAKE RECEIVER OPERATIONS

(75) Inventors: Katherine G. Brown, Coppell, TX (US); Sundararajan Sriram, Plano, TX (US); Francis Honore, Houston, TX (US); Kang Lee, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 666 days.

(21) Appl. No.: 09/607,410

(22) Filed: Jun. 30, 2000

Related U.S. Application Data

(60) Provisional application No. 60/183,457, filed on Feb. 18, 2000.

(51) Int. Cl.[7] .............................. H04B 1/69; H04B 1/707
(52) U.S. Cl. ......................................... 375/150; 370/342
(58) Field of Search ................................. 375/130, 142, 375/145, 147, 149, 150; 370/208, 209, 342, 335

(56) References Cited

U.S. PATENT DOCUMENTS 5,764,687 A * 6/1998 Easton .......................... 375/147
6,198,765 B1 * 3/2001 Cahn et al. .................. 375/142
6,584,313 B2 * 6/2003 Butler et al. ................. 455/434

* cited by examiner

Primary Examiner—Tesfaldet Bocure
Assistant Examiner—Qutbuddin Ghulamali
(74) Attorney, Agent, or Firm—Ronald O. Neerings; Wade James Brady III; Frederick J. Telecky, Jr.

(57) ABSTRACT

A programmable, flexible, vector correlation engine for CDMA mobile and base station chip rate signal processing. A correlator co-processor (CCP) performs the de-spreading tasks for a RAKE receiver, early/late correlations for time tracking, and has provision for coherent accumulation of different lengths. The CCP also performs energy estimation and non-coherent accumulation functions. The CCP can also perform correlation functions required for delay profile estimation, and for search/acquisition functions. The same centralized Data Path is used to perform all these functions; a common controller generates signals into the Data Path in response to tasks initiated by a host processor (e.g., DSP). The tasks written into the CCP are performed effectively in parallel by the CCP Data Path.

33 Claims, 21 Drawing Sheets

|  | 15-0 (R/W) |
|---|---|
| Task_Req_w0 | REQUEST FOR TASKS 15-0 |
| Task_Req_w1 | REQUEST FOR TASKS 31-16 |
| Task_Req_w2 | REQUEST FOR TASKS 47-32 |
| Task_Req_w3 | REQUEST FOR TASKS 63-48 |

| | 9 | 8-7 | 6 | 5 | 4 | 3-0 (R/W) |
|---|---|---|---|---|---|---|
| TASK REQUEST ID | START/STOP ENABLE | START/STOP ID | LOAD/ RELOAD ENABLE | LOAD/ RELOAD ID | TIMING ADJUST ENABLE | SLOT NUMBER |
| | 902 | 904 | 906 | 908 | 910 | 912 |

| | 15-10 | 9 | 8-6 | 5-3 | 2-0 (R/W) |
|---|---|---|---|---|---|
| FINGER INTERRUPT TABLE | UNUSED | HALF-SLOT ENABLE | SLOT INTERRUPT CONTROL | TPC INTERRUPT CONTROL | PILOT INTERRUPT CONTROL |
| | | 1010 | 1012 | | 1004 |

| | 1006 | 2 | 1008 | 1-0 |
|---|---|---|---|---|
| INTERRUPT CONTROL | | INTERRUPT ENABLE | | FIFO NUMBER |

*FIG. 11*

|  | 15-8 | 7-0 (R/W) |
|---|---|---|
| Update_Cycle | UNUSED | TASK-UPDATE CYCLE |

FSB CONFIGURATION TABLE

| ADDR | ENTRY |
|---|---|
| 0 | FSB_Config_F0_WID0 |
| 1 | FSB_Config_F0_WID1 |
| ⋮ | ⋮ |
| 7 | FSB_Config_F0_WID7 |
| ⋮ | ⋮ |
| 248 | FSB_Config_F31_WID0 |
| 249 | FSB_Config_F31_WID1 |
| ⋮ | ⋮ |
| 255 | FSB_Config_F31_WID7 |
| 256 | FSB_Config_F32_WID0 |
| 257 | FSB_Config_F32_WID1 |
| 258 | FSB_Config_F32_WID2 |
| 259 | FSB_Config_F32_WID3 |
| ⋮ | ⋮ |
| 380 | FSB_Config_F63_WID0 |
| 381 | FSB_Config_F63_WID1 |
| 382 | FSB_Config_F63_WID2 |
| 383 | FSB_Config_F63_WID3 |

8 ENTRIES FOR EACH FINGER

4 ENTRIES FOR EACH FINGER

*FIG. 15*

| | 15-0 (R/W) |
|---|---|
| FSB CONFIGURATION TABLE WORD 0 | START ADDRESS FOR FIRST SLOT |
| FSB CONFIGURATION TABLE WORD 1 | ADDRESS OFFSET FOR NEXT SLOT |

*FIG. 16*

| | 15-0 (R) |
|---|---|
| Task_Run/Stop_w0 | RUN/STOP STATUS FOR TASKS 7-0 |
| Task_Run/Stop_w1 | RUN/STOP STATUS FOR TASKS 15-8 |
| Task_Run/Stop_w2 | RUN/STOP STATUS FOR TASKS 23-16 |
| Task_Run/Stop_w3 | RUN/STOP STATUS FOR TASKS 31-24 |
| Task_Run/Stop_w4 | RUN/STOP STATUS FOR TASKS 39-32 |
| Task_Run/Stop_w5 | RUN/STOP STATUS FOR TASKS 47-40 |
| Task_Run/Stop_w6 | RUN/STOP STATUS FOR TASKS 56-48 |
| Task_Run/Stop_w7 | RUN/STOP STATUS FOR TASKS 63-56 |

*FIG. 27*

| | 15-0 (R) |
|---|---|
| Task_Ping/Pong_w0 | PING/PONG STATUS FOR TASKS 7-0 |
| Task_Ping/Pong_w1 | PING/PONG STATUS FOR TASKS 15-8 |
| Task_Ping/Pong_w2 | PING/PONG STATUS FOR TASKS 23-16 |
| Task_Ping/Pong_w3 | PING/PONG STATUS FOR TASKS 31-24 |
| Task_Ping/Pong_w4 | PING/PONG STATUS FOR TASKS 39-32 |
| Task_Ping/Pong_w5 | PING/PONG STATUS FOR TASKS 47-40 |
| Task_Ping/Pong_w6 | PING/PONG STATUS FOR TASKS 56-48 |
| Task_Ping/Pong_w7 | PING/PONG STATUS FOR TASKS 63-56 |

*FIG. 28*

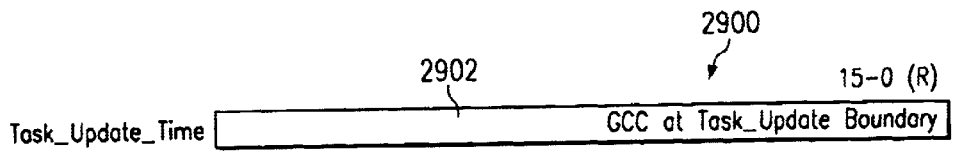

*FIG. 29*

| | 15-8 | 7-0 (R) |
|---|---|---|
| Cycle_Count | UNUSED | NUMBER OF CYCLES EXPENDED IN ITERATION |

*FIG. 30*

| | 15-0 (R) |
|---|---|
| GCC COUNT | CURRENT GCC VALUE |

*FIG. 31*

|  | 15-5 | 4 | 3 | 2 | 1 | 0 |
|---|---|---|---|---|---|---|
| Int_Error_Event_Status Register | UNUSED | CYCLES EXCEEDED | FIFO 3 OVERFLOW | FIFO 2 OVERFLOW | FIFO 1 OVERFLOW | FIFO 0 OVERFLOW |

FIG. 32

|  | 15-1 | 0 (R) |
|---|---|---|
| Int_System_Event_Status Register | UNUSED | Task_Update |

|  | 15-4 | 3 | 2 | 1 | 0 |
|---|---|---|---|---|---|
| FIFO EMPTY STATUS | UNUSED | FIFO 3 | FIFO 2 | FIFO 1 | FIFO 0 |

FIG. 34

|  | 15-6 | 5-0 (R) |
|---|---|---|
| FIFO 0 STATUS REGISTER | UNUSED | NUMBER OF ENTRIES |

FIG. 35

|  | 15-6 | 5-0 (R) |
|---|---|---|
| FIFO 1 STATUS REGISTER | UNUSED | NUMBER OF ENTRIES |

FIG. 36

|  | 15-6 | 5-0 (R) |
|---|---|---|
| FIFO 2 STATUS REGISTER | UNUSED | NUMBER OF ENTRIES |

FIG. 37

|  | 31-24 (R) | 23-0 (R) |
|---|---|---|
| EOL BUFFER F0 dw0 | UNUSED | FINGER 0: EARLY ENERGY |
| EOL BUFFER F0 dw1 | UNUSED | FINGER 0: ON-TIME ENERGY |
| EOL BUFFER F0 dw2 | UNUSED | FINGER 0: LATE ENERGY |
| ⋮ | ⋮ | ⋮ |
| EOL BUFFER F63 dw0 | UNUSED | FINGER 63: EARLY ENERGY |
| EOL BUFFER F63 dw1 | UNUSED | FINGER 63: ON-TIME ENERGY |
| EOL BUFFER F63 dw2 | UNUSED | FINGER 63: LATE ENERGY |

|  | 23-0 (R) |
|---|---|
| DPE BUFFER BLOCK0 dw0 | ENERGY VALUE FOR BLOCK 0, CHIP-OFFSET 0 |
| DPE BUFFER BLOCK0 dw1 | ENERGY VALUE FOR BLOCK 0, CHIP-OFFSET 1/2 |
| ⋮ | ⋮ |
| DPE BUFFER BLOCK0 dw62 | ENERGY VALUE FOR BLOCK 0, CHIP-OFFSET 31 |
| DPE BUFFER BLOCK0 dw63 | ENERGY VALUE FOR BLOCK 0, CHIP-OFFSET 31 1/2 |
| ⋮ | ⋮ |
| DPE BUFFER BLOCK15 dw0 | ENERGY VALUE FOR BLOCK 15, CHIP-OFFSET 0 |
| DPE BUFFER BLOCK15 dw1 | ENERGY VALUE FOR BLOCK 15, CHIP-OFFSET 1/2 |
| ⋮ | ⋮ |
| DPE BUFFER BLOCK15 dw62 | ENERGY VALUE FOR BLOCK 15, CHIP-OFFSET 31 |
| DPE BUFFER BLOCK15 dw63 | ENERGY VALUE FOR BLOCK 15, CHIP-OFFSET 31 1/2 |

*FIG. 44*

| | 23-0 (R) |
|---|---|
| LCI BUFFER BLOCK0 dw0 | ENERGY VALUE FOR BLOCK 0, CODE 0, ON-TIME |
| LCI BUFFER BLOCK0 dw1 | ENERGY VALUE FOR BLOCK 0, CODE 0, LATE-TIME |
| ⋮ | ⋮ |
| LCI BUFFER BLOCK0 dw14 | ENERGY VALUE FOR BLOCK 0, CODE 7, ON-TIME |
| LCI BUFFER BLOCK0 dw15 | ENERGY VALUE FOR BLOCK 0, CODE 7, LATE-TIME |
| ⋮ | ⋮ |
| LCI BUFFER BLOCK7 dw0 | ENERGY VALUE FOR BLOCK 7, CODE 0, ON-TIME |
| LCI BUFFER BLOCK7 dw1 | ENERGY VALUE FOR BLOCK 7, CODE 0, LATE-TIME |
| ⋮ | ⋮ |
| LCI BUFFER BLOCK7 dw14 | ENERGY VALUE FOR BLOCK 7, CODE 7, ON-TIME |
| LCI BUFFER BLOCK7 dw15 | ENERGY VALUE FOR BLOCK 7, CODE 7, LATE-TIME |

*FIG. 45*

| | 15-0 (R) |
|---|---|
| PSC SEARCH BUFFER w0 | PSC SEARCH RESULT FOR OFFSET 0 RELATIVE TO GCC |
| PSC SEARCH BUFFER w1 | PSC SEARCH RESULT FOR OFFSET 1/2 RELATIVE TO GCC |
| ⋮ | ⋮ |
| PSC SEARCH BUFFER w5118 | PSC SEARCH RESULT FOR OFFSET 2559 RELATIVE TO GCC |
| PSC SEARCH BUFFER w5119 | PSC SEARCH RESULT FOR OFFSET 2559 1/2 RELATIVE TO GCC |

*FIG. 46*

| FIRST HALF | 32-16 (R) | 15-0 (R) |
|---|---|---|
| SSC CIRCULAR BUFFER 0 w0 | SSC SYMBOL (REAL PART) | SSC SYMBOL (IMAGINARY PART) |
| SSC CIRCULAR BUFFER 0 w1 | SSC SYMBOL (REAL PART) | SSC SYMBOL (IMAGINARY PART) |
| ⋮ | ⋮ | ⋮ |
| SSC CIRCULAR BUFFER 0 w15 | SSC SYMBOL (REAL PART) | SSC SYMBOL (IMAGINARY PART) |
| ⋮ | ⋮ | ⋮ |
| SSC CIRCULAR BUFFER 7 w0 | SSC SYMBOL (REAL PART) | SSC SYMBOL (IMAGINARY PART) |
| SSC CIRCULAR BUFFER 7 w1 | SSC SYMBOL (REAL PART) | SSC SYMBOL (IMAGINARY PART) |
| ⋮ | ⋮ | ⋮ |
| SSC CIRCULAR BUFFER 7 w15 | SSC SYMBOL (REAL PART) | SSC SYMBOL (IMAGINARY PART) |
| SECOND HALF | | |
| SSC CIRCULAR BUFFER 0 w0 | PSC SYMBOL (REAL PART) | PSC SYMBOL (IMAGINARY PART) |
| SSC CIRCULAR BUFFER 0 w1 | PSC SYMBOL (REAL PART) | PSC SYMBOL (IMAGINARY PART) |
| ⋮ | ⋮ | ⋮ |
| SSC CIRCULAR BUFFER 0 w15 | PSC SYMBOL (REAL PART) | PSC SYMBOL (IMAGINARY PART) |
| ⋮ | ⋮ | ⋮ |
| SSC CIRCULAR BUFFER 7 w0 | PSC SYMBOL (REAL PART) | PSC SYMBOL (IMAGINARY PART) |
| SSC CIRCULAR BUFFER 7 w1 | PSC SYMBOL (REAL PART) | PSC SYMBOL (IMAGINARY PART) |
| ⋮ | ⋮ | ⋮ |
| SSC CIRCULAR BUFFER 7 w15 | PSC SYMBOL (REAL PART) | PSC SYMBOL (IMAGINARY PART) |

FIG. 47

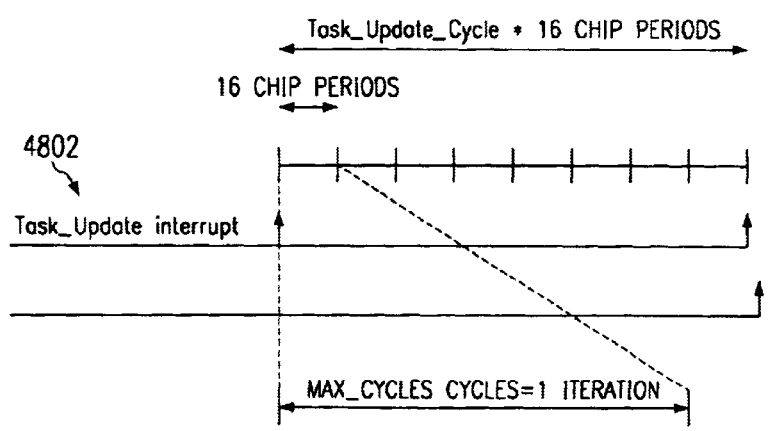

FIG. 48

CORRELATOR CO-PROCESSOR FOR CDMA RAKE RECEIVER OPERATIONS

This application claims priority under 35 USC §119 (e)(1) of Provisional Application No. 60/183,457, filed Feb. 18, 2000.

BACKGROUND OF THE INVENTION

1. Field of the Invention

This invention relates generally to RAKE receivers, and more particularly to a multiple channel programmable correlator co-processor (CCP) that supports CDMA base-station and handset RAKE receiver operations.

2. Description of the Prior Art

A RAKE receiver is a radio receiver that includes a plurality of independent receiver units, most commonly referred to as RAKE branches, each of which receives and operates as a diversity combiner of multipath propagated signals. RAKE receivers are especially used in CDMA receivers, among others. RAKE receivers generally involve correlations and accumulations associated with a particular wireless communication protocol wherein each RAKE branch is dedicated to processing the multipath propagated signals in a predetermined manner to accommodate a desired communication protocol. U.S. Pat. No. 5,978,423, entitled *Method and Arrangement of Signal Tracking and A Rake-Receiver Utilizing the Arrangement*, issued Nov. 2, 1999 to Farjh and U.S. Pat. No. No. 5,917,851, entitled *Method for Allocating Rake Branches and Rake Receiver*, issued Jun. 29, 1999 to Jarvela et al. exemplify prior art RAKE receiver techniques and architectures in which RAKE branches are permanently allocated to fixed signal processing tasks.

In view of the foregoing discussion, a need exists in the wireless communications art for a programmable, highly flexible, vector-based correlation machine capable of performing CDMA base-station and handset RAKE receiver operations such as finger spreading and search, among other things, for multiple channels, regardless of the particular wireless communication protocol.

SUMMARY OF THE INVENTION

The present invention is directed to a Correlator Co-Processor (CCP) particularly suitable for supporting spread-spectrum CDMA communication systems such as IMT2000-DS (3.84 MHz chip rate specification), IMT2000-MC, IMT2000-TDD, and CDMAOne/IS-95 as well as GPS. The CCP is a programmable, highly flexible, vector-based correlation machine that performs CDMA base-station and mobile-station RAKE receiver operations. The CCP is a centralized correlation machine that can be used for various RAKE receiver tasks such as finger spreading and search, among other things, to accommodate most functions common to RAKE receivers, regardless of the particular wireless protocol. Each RAKE receiver task uses a common centralized data path of the CCP in a time-multiplexed fashion, so that many different tasks can be simultaneously performed on the CCP. The main data path is vectorized in order to reduce power dissipation.

Sharing of the CCP main data path for various RAKE receiver functions, e.g. finger demodulation, code tracking loops and search, accommodates a CCP structure that has programmably configurable resources, rather than hard-wired resources common to known architectures. The amount of CCP resources is allocated in any desired way to accommodate a given situation. Unused CCP resources are disabled to preserve power dissipation.

The CCP is capable of performing complex valued correlations that consist of de-spreading and coherent accumulation. The CCP is also capable of performing non-coherent accumulations such as accumulating "symbol" energy values and returning the accumulated energy values for a specified window of offsets for search operations. The CCP, for example, can accumulate early, on-time and late samples of a RAKE finger for use in a finger's code-tracking loop (typically a delay-lock loop (DLL)).

One preferred embodiment of the CCP comprises a Data Path having "multipliers" to multiply samples from an input buffer with samples of pseudo noise (PN) and Walsh codes, adder trees to generate partial correlations, a coherent accumulator to sum the current partial correlation with previous partial correlations(s), and a post processing block for performing RMS (sqrt $(I^2+Q^2)$) calculations (sometimes referred to as "energy" values) and non-coherent accumulations. The CCP Data Path preferably employs extensive pipeline stages to maximize computational capacity as well as temporary ("scratch") memories to store partial correlation and intermediate RMS accumulation results. The preferred embodiment of the CCP further comprises a plurality of output buffers such as a Finger Symbol Buffer, DPE Buffer, LCI Buffer, EOL Buffer, SSC Search Buffer, and/or PSC Search Buffer for supporting various types of tasks and storing task results. According to the preferred embodiment, the CCP further comprises PN and Walsh generators, a Controller, a Task Buffer, an Interrupt Generator and Configuration Parameter storage units.

The present invention thus provides various technical advantages. In one aspect of the invention, a programmable, highly flexible, vector-based correlator co-processor is provided to support a plurality of CDMA base-station and mobile-station RAKE receiver operations.

In another aspect of the invention, a centralized correlation machine is provided to accomplish various RAKE receiver tasks such as finger de-spreading and search.

In yet another aspect of the invention, a correlator co-processor is provided with a centralized data path capable of supporting time-multiplexed operations such that many different tasks can be simultaneously performed by the correlator co-processor.

In still another aspect of the invention, a correlator co-processor for supporting a plurality of CDMA base-station and mobile-station RAKE receiver operations is provided with a vectorized main data path to reduce power dissipation.

According to another aspect of the invention, a correlator co-processor having a shared data path is programmably configurable to accommodate a plurality of CDMA base-station and mobile-station RAKE receiver operations without necessitating "hardwired" structural elements.

According to yet another aspect of the invention, a correlator co-processor for supporting a plurality of CDMA base-station and mobile-station RAKE receiver operations is capable of performing complex valued correlations consisting of de-spreading and coherent accumulation and is further capable of accumulating "symbol" energy values (non-coherent accumulations).

In still another aspect of the invention, a correlator co-processor for supporting a plurality of CDMA base-station and mobile-station RAKE receiver operations is configurable to support the IMT2000-DS (3.84 MHz chip rate specification), IMT2000-MC, IMT2000-TDD, CDMAOne/IS-95 and GPS wireless protocols.

As used herein, the following terms have the following meanings.

"3G" means 3$^{rd}$ generation.
"ABB" means analog baseband (cf AFE).
"A/D (ADC)" means analog to digital converter.
"AFC" means automatic frequency control.
"AFE" means analog front end (cf ABB).
"AGC" means automatic gain control.
"ARIB" means Association of Radio Industries and Businesses (Japan).
"ARM" means advance RISC machine.
"BS" means base station.
"CCP" means correlator co-processor.
"CDMA" means code division multiple access.
"CPICH" means common pilot channel.
"D/A (DAC)" means digital to analog converter.
"DBB" means digital baseband.
"DLL" means delay lock loop.
"DMA" means direct memory access.
"DPCCH" means dedicated physical control channel.
"DPE (DPPE)" means delay profile estimation.
"DPP" means delay path power.
"DSP" means digital signal processor/processing.
"DSPRDC" means DSP Research and Development Center.
"ETSI" means European Telecommunications Standards Institute.
"FSC" means first short code.
"GPS" means global positioning system.
"HW" means hardware.
"ITU" means International Telecommunications Union.
"L1" means layer 1 (physical layer).
"L2" means layer 2 (link layer).
"L3" means layer 3 (network layer).
"LC" means long code.
"LCI" means long code indicator.
"LFSR" means linear feedback shifter register.
"MS" means mobile station.
"PICH" means paging indication channel.
"PN" means pseudo noise.
"PSC" means primary search code.
"RF" means radio frequency.
"RTT" means radio transmission technology.
"RX" means receive/receiver.
"SC" means short code.
"SIR" means signal to interference ratio.
"SSC" means secondary search code.
"SW" means software.
"TI" means Texas Instruments Incorporated.
"TIA" means Telecommunications Industry Association.
"TRDC" means Tsukuba Research and Development Center.
"TX" means transmit/transmitter.
"UMTS" means Universal Mobile Telephone System.
"WBU" means Wireless Business Unit (TI).
"WCS" means Wireless Communications Systems (TI).
"WCDMA" means wideband CDMA.
"Algorithmic Software" means an algorithmic program used to direct the processing of data by a computer or data processing device.
"Data Processing Device" refers to a CPU, DSP, microprocessor, micro-controller, or other like device and an interface system, wherein the interface system provides access to the data processing device such that data can be entered and processed by the data processing device.
"Discrete Data" means digitized data that can be stored in the form of singularly isolated, discontinuous data or digits.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein:

FIG. 8 illustrates a plurality of task request bits associated with a CCP;

FIG. 9 illustrates a task request ID register format;

FIG. 10 illustrates a finger interrupt table format;

FIG. 11 illustrates a finger interrupt control format;

FIG. 12 illustrates a Task_Update Cycle_Register;

FIG. 15 illustrates a FSB buffer configuration table;

FIG. 16 illustrates a FSB buffer configuration table entry;

FIG. 18 illustrates a pilot bit table entry form at;

FIG. 27 illustrates task run/stop status bits;

FIG. 28,illustrates task ping/pong status bits;

FIG. 29 illustrates a task update time register;

FIG. 30 illustrates a cycle count register;

FIG. 31 illustrates a current GCC count value register;

FIG. 32 illustrates an Int_Error_Event_Status register;

FIG. 33 illustrates an Int_System_Event_Status register;

FIG. 34 illustrates a FIFO empty status;

FIG. 35 illustrates a FIFO 0 status;

FIG. 36 illustrates a FIFO 1 status;

FIG. 37 illustrates a FIFO 2 status;

FIG. 43 illustrates an EOL buffer memory map;

FIG. 44 illustrates a DPE buffer memory map;

FIG. 45 illustrates a LCI buffer memory map;

FIG. 46 illustrates a PSC search buffer memory map;

FIG. 47 illustrates a secondary search code buffer format;

FIG. 48 illustrates a task update timing diagram;

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention. The Detailed Description of the Preferred Embodiments described herein below, although generally applicable to a mobile station capable of supporting IMT2000-DS communication standards, for example, utilizes concepts equally applicable to Base Stations and to other CDMA communication standards.

DETAILED DESCRIPTION OF THE PREFERRED EMBODIMENTS

Figure 1:
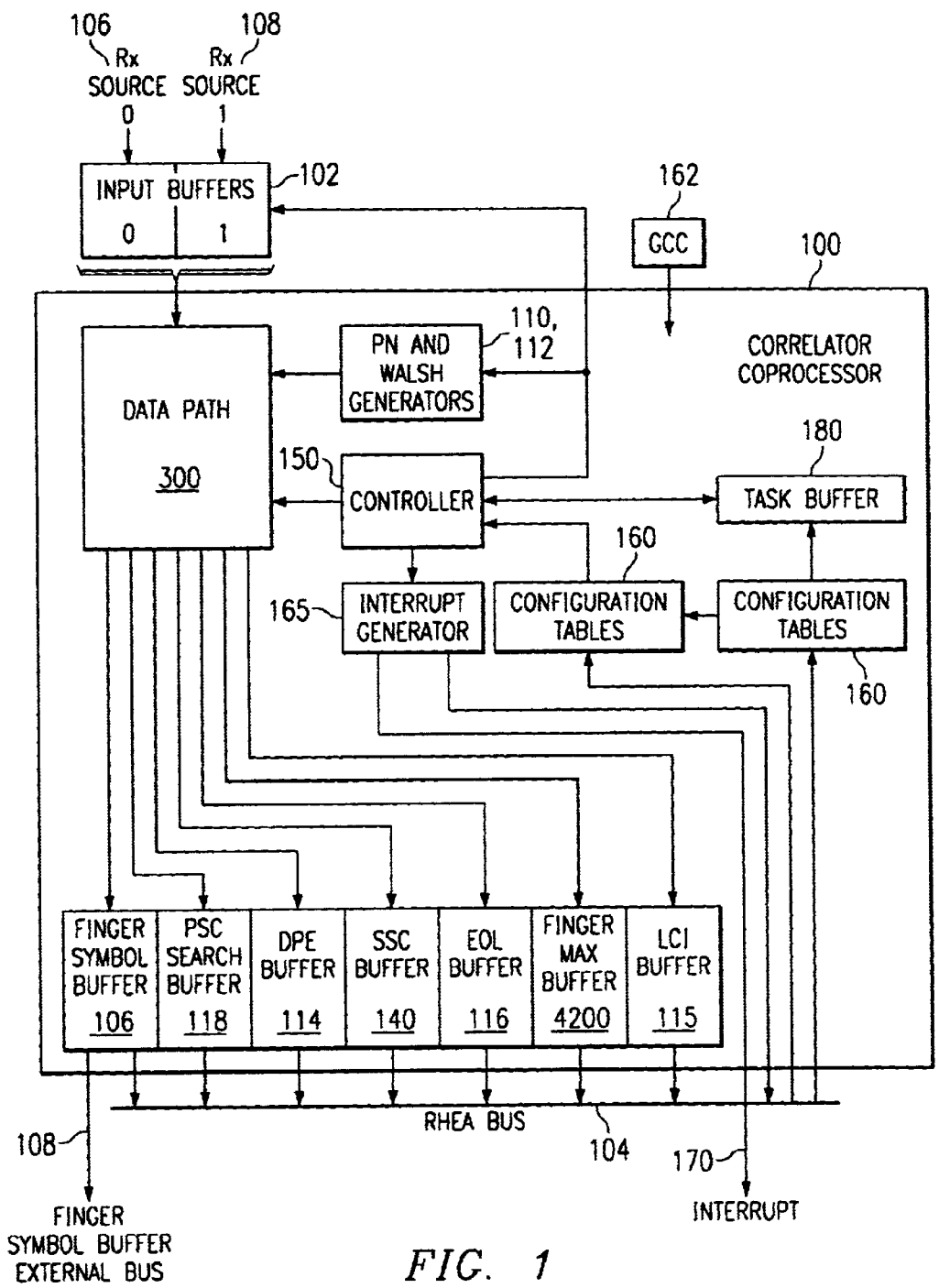
FIG. 1 illustrates a simplified top-level block diagram showing a CCP according to one embodiment of the present invention.

FIG. 1 illustrates a simplified top-level block diagram of a correlator co-processor (CCP) 100 according to a preferred embodiment of the present invention. The CCP 100 supports, among others, a 1X clock rate of 3.84 MHz, i.e., the baseline IMT2000 chip rate, by utilizing a 16X system clock (SYS_CLK) and a 8X (30.72 MHz), 4X (15.36 MHz), or 2X (7.68 MHz) receive sample clock. The system clock and receive sample clock are synchronous, i.e., phase aligned. A 4X receive sample clock reduces CCP 100 input buffer requirements and AID power at the cost of reduced signal-to-noise ratio (SNR). A 2X receive sample clock might be used, for example, in a CCP 100 that implements only search tasks. The receive sample clock only affects the input buffer(s) 102 and not the core of the CCP 100.

The CCP 100 can receive multiple in-phase (I) and quadrature (Q) signal samples from multiple sources to accommodate antenna diversity. The buffers 102 that store the I/Q samples are seen to be outside of the core of the CCP 100. In a preferred embodiment, four sources associated with handset RAKE receiver operations (18 sources for base-station RAKE receiver operations) may be supported wherein the I and Q samples are up to 4 to 6-bits or possibly even more each; and each source generates signals at two, four, or eight times the chip rate.

The CCP 100, according to one embodiment, is a RHEA peripheral. When used in association with a host processor such as a DSP having RHEA Bus interface capabilities, full functionality of the CCP 100 can be realized by using a single bus such as the RHEA Bus 104, subject to RHEA (DSP) Bus 104 bandwidth limitations in order to support handset RAKE receiver operations. When used in association with a host processor such as a TMS320C6x model DSP manufactured by Texas Instruments Incorporated, full functionality of the CCP 100 can be realized by using a EMIF bus to accommodate base station use. The finger symbol buffer (FSB) 106 (which stores finger data) can be seen to be accessed via a FSB external bus 108 to accommodate flexibility in retrieving finger data. An external agent can retrieve this data, for example, to accommodate hardware-based symbol processing. Usage of the FSB external bus 108 depends on how the CCP 100 is connected in the DBB system.

The CCP 100 is capable of performing correlations and accumulations (coherent and non-coherent). The basic operation is the correlation, commonly referred to as de-spreading (followed by sum-and-dump), which is used to remove the effects of long-code scrambling and Walsh spreading (using WCDMA nomenclature). Importantly, the CCP 100 controls these correlations and accumulations in specific ways to achieve all RAKE and searcher operations.

Further, the CCP 100 is a multi-tasking machine. A CCP finger operation, for example, is called a finger task. Tasks supported by the CCP 100 include: 1) finger task (Walsh de-spreading of one or more channels, and early-ontime-late (EOL) energy measurement)) to support both base station and handset RAKE receiver operations, 2) delay profile estimation (DPE) task or "path search" to support both base station and handset RAKE receiver operations, 3) primary search code (PSC) search task or "stage 1 search" to support handset RAKE receiver operations, 4) secondary search code (SSC) search or "stage 2 search" to support handset RAKE receiver operations, 5) long code identifier (LCI) search task or "stage 3 search" to support handset RAKE receiver operations, 6) paging indication channel (PICH) de-spreading task to support handset RAKE receiver operations, and 7) access search to support base station RAKE receiver operations. The present invention is not so limited however, and it shall be understood that the CCP 100, appropriately configured, is capable of supporting more or less tasks than those tasks referenced above. The foregoing tasks 1–6 are described herein below to further exemplify the functional capabilities of the CCP 100.

Regarding a CCP finger task, long-code (LC) de-scrambling and Walsh de-spreading are performed, resulting in a complex output symbol stream (I and Q). Each finger operation can accommodate multiple Walsh code channels so long as the channels have the same LC offset, frame offset, slot offset and spreading factor. A maximum energy for each Walsh channel of each finger is output once per slot to aid in the combining of symbols. Each finger operation supports one set of early-ontime-late (EOL) energy measurements associated with a particular Walsh code channel. These energy measurements are output once per frame.

Figure 2:
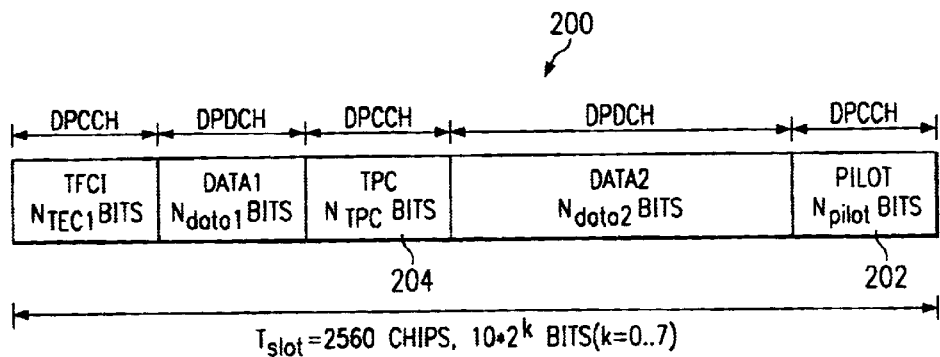
FIG. 2 shows an IMT2000-DS example of a Downlink Dedicated Physical Channel (DPCH) having pilot bits at the end of the slot and TPC bit(s) in the middle of the slot.

FIG. 2 depicts an IMT2000-DS timeslot 200 for a downlink dedicated physical channel (DPCH) having pilot bits 202 at the end of the timeslot 200 and TPC bit(s) 204 in the middle of the timeslot 200. Because the pilot and transmit-power-control (TPC) bit(s) locations may differ for different spreading factors as well as between different wireless protocol standards, the CCP 100 is capable of configuring the pilot and TPC bit locations to accommodate any wireless protocol that uses such pilot bits and TPC bits.

Each CCP finger supports one set of EOL energy measurements, as stated above, to support code-tracking loop operations, e.g. DLL. In this manner, open-loop (STTD) transmit diversity is supported by the CCP 100. Pilot symbols, for example, can be converted into an energy value wherein the energy values of all pilot symbols in one frame are accumulated. Pilot symbols can also be accumulated over one or multiple slots and the resulting complex value converted into one energy value. All such resulting energy values inside each frame are then accumulated. The energy associated with multiple antennas is combined to support STTD. Further, non-pilot energy can be measured wherein each symbol is converted into an energy value and the energy values of all symbols in one frame are accumulated.

The delay profile estimation (DPE) task is used by the CCP 100 to identify potential multi-paths in a window of offsets. An energy value is returned for every chip or ½-chip offset in a specified offset window. Measurements are taken over a specified number of radio slots and output periodically. Preferably, the DPE task can measure the requisite energy in the same way EOL measurements are implemented for the finger task described above.

The primary search code (PSC) search task is used by the CCP 100 for acquisition of new base stations, also referred to as "stage 1" search in the WCDMA standards. The "stage 1" search returns the slot-periodic matched-filter output energy values (for 5120 ½-chip offsets). Measurements take place over a specified number of radio slots. The CCP 100 preferably takes advantage of the hierarchical structure in a 256-chip PSC and performs matched-filtering in two steps of 16 operations each. The first step consumes CCP 100 cycles and the second step runs on post-processing hardware (not shown). The 256-chip PSC preferably comprises a programmable 16×16 PSC sequence.

Second search code (SSC) search, or "stage 2" search, is used by the CCP 100 to establish frame synchronization of a new base station and to identify its long-code group. The SSC search task assumes the SSC Walsh codes to have 16×16 structures and "de-spreads" the data stream with a spreading factor of 16 within the 256 chip PSC/SSC search code position. The PSC symbols are preferably de-spread at the same time. Therefore, 16 complex symbols per slot are output for the SSC and 16 symbols per slot are output for the PSC. Remaining Walsh-Hadamard transform operations are preferably implemented outside of the CCP 100, in a DSP or dedicated hardware.

Long code identifier (LCI) search, or "stage 3" search, is used by the CCP 100 to determine the exact scrambling code, following search stages 1 and 2 described above. This CCP task measures the de-spread energies using each of the specified scrambling codes. Further, the LCI search task can most preferably measure the common pilot energy in the same way pilot measurements are implemented in association with the DPE task described herein above.

The paging indication channel task is used by the CCP 100 to de-spread the PICH symbols across a window of offsets. This allows for some uncertainty in the exact timing of the channel during de-spreading. De-spread symbols are buffered for each offset in the specified window.

The CCP 100 resources can be partitioned in different ways to implement the RAKE receiver tasks described above. For this reason, some parameters discussed herein are referred to with names rather than numbers (e.g. SYS_CLK, MAX_CYCLES). There are, for example, a total of MAX_CYCLES "correlation cycles", or cycles, supported by one embodiment of the CCP 100. The CCP 100 has a processing capacity roughly equivalent to MAX_CYCLES discrete correlators for RAKE fingers. The CCP 100 has 4*MAX_CYCLES equivalent correlators for implementing a DPE search task. The number of correlation cycles expended for each CCP 100 task is then described as follows. Regarding a finger task, each Walsh channel uses one correlation cycle, independent of its spreading factor and each set of EOL measurements uses three correlation cycles. Further, the maximum symbol energy in a slot for each Walsh channel is determined. Regarding a DPE task, window sizes are a multiple of 16 chips; and every 2-chips of window size uses only one cycle, even though two equivalent correlations are performed (four equivalent correlations performed for the ontime and ontime+½-chip samples when the ½-chip option is enabled). The PSC and SSC search tasks use 16 cycles and 2 cycles respectively, while the LCI search task uses one cycle per long-code. Regarding the PICH task, window sizes are a multiple of 16-chips; and each chip of window size uses one cycle, regardless of whether the ½-chip option is enabled.

The CCP 100 supports MAX_FINGERS simultaneous finger tasks; wherein NUM_WALSH8 of these finger tasks support up to 8 Walsh channels, and. NUM_WALSH4 support up to 4 Walsh channels. Each finger task may support 1 set of EOL measurements, but a finger task making EOL measurements will reduce by one the number of Walsh channels supported on that finger. Hence, finger tasks may specify up to a maximum of (7×NUM_LARGE_FINGERS+3×(MAX_FINGERS_NUM_LARGE_FINGERS) cycles if necessary (only MAX_CYCLES cycles can be run at any one time).

The CCP 100 supports one PSC search task, and if present, must be the first task to run, in order for the post-processing of the results to have time to be completed. The CCP 100 further supports up to MAX_DPE DPR search tasks which can be supported only if the sum of the sizes of the search windows is less than MAX_CYCLES. The CCP 100 also supports up to MAX_LCI LCI search tasks as well as a total of MAX_TASKS tasks in any combination that conforms to the above limitations. All tasks together cannot exceed MAX_CYCLES cycles. The CCP 100 is further intended to support one PICH task, although more could be run subject to the limitations of finger Ids (up to MAX_FINGERS), FSB size, and MAX_CYCLES limitations. Most preferably, a disabled task does not consume any cycles. An enabled task that is not implemented or waiting to run however, consumes one cycle per task. CCP 100 resource allocation can be exemplified using the above limitations as applied to various scenarios described herein below.

Scenario 1: 1 DPE task of 256-chip offsets (total cycles used=128); This scenario could occur during an inter-frequency base station measurement or upon "wake" in standby mode. Using full CCP capabilities is justified because quick measurement or re-acquisition is important.

Scenario 2: 2 DPE tasks of 256-chip offsets each (total cycles used=256); This scenario could occur during an inter-frequency base station measurement.

Scenario 3: 1 DPE task of 256-chip offset, 1 PSC search task, 6 finger tasks of 16 Walsh codes (implemented as 12 fingers of 8 codes each), and 6 finger tasks of EOL measurements (total cycles used=256/2+16+6*16+6*3=258); This could be a steady-state scenario with one radio link that consists of 16 Walsh channels. The full usage of CCP 100 resources is needed because of the large number of Walsh channels.

Scenario 4: 1 DPE task of 256-chip offset, 1 PSC search task, 6 finger tasks of 4 Walsh codes, 6 finger tasks of 4 Walsh codes, 6 finger tasks of 2 Walsh codes, 6 finger tasks of 1 Walsh code, and 6 finger tasks of EOL measurements (total cycles used=256/2+16+6*4+6*4+6*2+6*1+6*3=228);
This could be a steady-state scenario with four radio links, two with 4 codes, one with 2 codes, and one with 1 code.

Scenario 5: 1 DPE task of 128-chip offset and 6 finger tasks of 1 Walsh code, each with EOL measurements (total cycles used=128/2+6*1+6*3=88); This could be a steady-state scenario with one radio link each with one code. The DPE search window is small because delay spread is small or because a large search is divided into parts.

Scenario 6: 1 DPE task of 128-chip offset and 2 finger tasks of 4 Walsh codes each, plus EOL measurements for each (total cycles used=128/2+2*4+2*3=78); This could be a 2 Mbps scenario (indoors).

As stated herein before, the CCP 100 performs "chip"-rate processing and energy accumulation. Most preferably, the CCP 100 does not perform "symbol"-rate receiver operations such as channel estimation, maximal-ratio combining, and de-interleaving, nor feedback loops such as AGC, AFC, and DLL. The CCP 100 preferably supplies the energy values to the feedback loop (for DLL), but does not operate on the loop itself. Such symbol operations can be performed either in a DSP or in dedicated hardware outside of the CCP 100. In view of the foregoing, it can be seen that the capabilities and architecture of the CCP 100 are functions of the number of needed fingers and multipath delay-spread, among other factors, e.g. datapath width, clock rates, ASIC technology and the like.

The CCP 100 importantly performs correlations repeatedly using data associated with a buffered block of receive (sub)chip-rate samples. The Data Path 300 is capable of performing a partial correlation using multiple chips of data in a single cycle. These capabilities and functions are now described below in detail in association with each of the CCP 100 elements illustrated in FIG. 1. With continued reference to FIG. 1, the Input Buffers 102 store a stream of receive I/Q sub-chip samples for processing by the CCP 100 Data Path 300. These sub-chip samples may come directly from an analog front-end (AFE), digital front-end filtering, or digital interpolation filtering in a manner well known to those skilled in the wireless communication art. For each correlation cycle, the CCP 100 selects a set of input samples corresponding to a particular sub-chip sample. The CCP 100 may receive input data from multiple sources 106, 108, for example, to support multiple antennae. Each input source 106, 108 may be at a 2X, 4X or 8X chip rate according to the instant embodiment. Up to four input sources are supported in the embodiment. Further, the Input Buffers 102 may be implemented as custom register files or as memory.

The CCP Data Path 300 includes "multipliers" to multiply the samples from the Input Buffer 102 with samples of PN and Walsh codes from PN and Walsh Generators 110, 112, adder trees to generate partial correlations, as discussed above, a coherent accumulator to sum the current partial correlation with previous partial correlation(s), and a post processing block for performing RMS (sqrt ($I^2+Q^2$)) calculations (sometimes referred to as "energy" values) and non-coherent accumulations. The CCP Data Path 300 most preferably further employs extensive pipeline stages to maximize computational capacity. Temporary ("scratch") memories are used to store partial correlation and intermediate RMS accumulation results. Task results are stored in one of the output buffers, e.g. Finger Symbol Buffer 106, LCI Buffer 115 and/or DPE Buffer 114, EOL Buffer 116, SSC Search Buffer 140, Finger Max Buffer 4200, and/or PSC Search Buffer 118, depending on the type of task.

Figure 3:
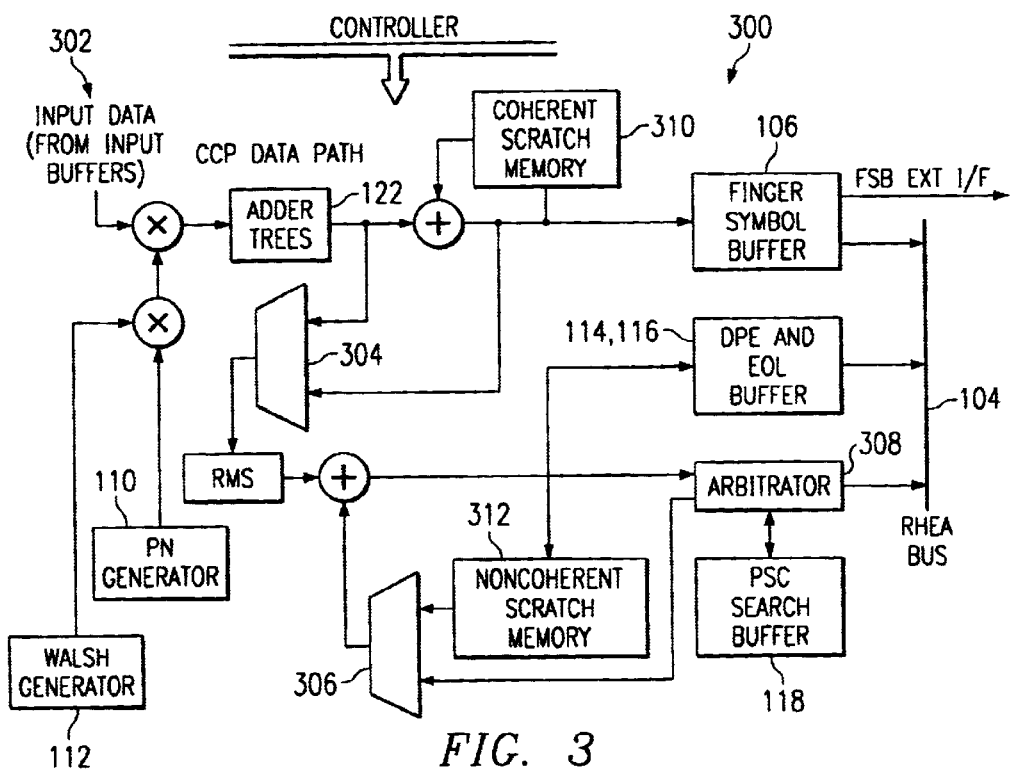
FIG. 3 is a simplified block diagram illustrating a CCP Data Path structure.

FIG. 3 illustrates a simplified top-level block diagram depicting the CCP Data Path 300 according to one embodiment of the present invention. Regarding Data Path 300 precision, the CCP 100 accumulates bits and discards bits at different stages of the Data Path 300. The input data 302 (from the Input Buffers 102) is obtained via a 6-bit A/D converter (not shown). After passing through Adder Trees 122, there are 17 data bits. At this point, some bits are discarded. Before writing symbols to the Finger Symbol Buffer 106, 9 MSB's are discarded, with saturation, for SF=4; or 1 MSB is discarded, with saturation, for other SF's. Regarding the symbols passed into the remainder of the Data Path 300 (e.g. EOL Buffer 116, DPE Buffer 114, LCI Buffer 115), 4 MSB's and 2 LSB's are discarded, with saturation. Following coherent accumulation 304, there are 22 bits. Of these 22 bits, 18 bits are kept starting from $(13+\max(5, \log 2(N_S)))^{th}$ LSB, wherein $N_S$ is the number of. symbols of coherent accumulation. Following non-coherent accumulation 306, there are 32 bits. Of these 32 bits, 24 bits are kept starting from $(13+\max(5, \log 2(N_{NS})))^{th}$ LSB, wherein $N_{NS}$ is the number of non-coherent accumulations.

The PSC Search Buffer 118 serves two purposes. First, it stores running energy values while the PSC search task is active. In this regard, it is used as accumulator memory by the CCP 100. Second, when the PSC search task is finished, it stores the final energy values, which can then be read by the host processor, i.e. DSP. One energy value per ½-chip offset is returned, thereby resulting in a total of 5120 energy values for a time slot having 2560 chips such as illustrated in FIG. 2. According to one embodiment, the PSC search task requires a post-processor (not shown), to acquire the 5120 energy values; where the PSC Search Buffer 118 is dedicated for intermediate first stage values which would be read by the aforesaid post-processor. While the PSC search task is active, the PSC Search Buffer 118 is accessible only by the CCP Data Path 300. When the PSC search task is inactive, the PSC Search Buffer 118 is accessible only via the DSP Bus 104. An arbitrator 308 handles access rights. Further, an interrupt may be generated upon completion of a PSC search task.

The DPE Buffer 114 and LCI Buffer 115 store DPE and LCI search results respectively. They are directly readable via the DSP Bus 104 at all times. The DPR Buffer 114 and LCI Buffer 115 are single-buffered, and new results overwrite old ones. When new results are ready, they may be read on the DSP Bus 104 directly by the host processor or by the DSP DMA Controller 150 shown in FIG. 1. Task-based interrupts can be generated when new results are ready. When a DPE task finishes, for example, an interrupt may be generated.

The EOL Buffer 116 stores finger EOL measurement results. It is directly readable via the DSP Bus 104 at all times. The EOL Buffer 116 is also single-buffered, and as with the DPE Buffer 114, new results over-write old ones. When new results are ready, they may be read on the DSP Bus 104 directly by the host processor or by the DSP DMA Controller 150. The finger task can issue various slot-based interrupt events that can be used to signal the availability of new EOL data.

The Finger Symbol Buffer 106 stores complex I and Q "symbols" that result from finger tasks. All symbols such as pilot, TPC, data and the like, are stored here after they are received and processed by the CCP Data Path 300. The Finger Symbol Buffer 106 is implemented as a multi-slot circular buffer for each Walsh channel. The Finger Symbol Buffer 106 serves as intermediate storage for downstream symbol-rate processing. The size of the Finger Symbol Buffer 106 is preferably a compromise between area and the rate at which data must be moved to where downstream processing takes place. The Finger Symbol Buffer 106 is also accessible on the FSB External Bus 108 that may be used when downstream processing and/or storage take place outside of the host processor (i.e. DSP system).

Regarding the PN Generator 110 and Walsh Code Generator 112, a CCP 100 task specifies a PN code ("Gold code") and a Walsh code to be generated as well as a code offset. The PN/Walsh Code Generators 110, 112 then generate a block of the specified PN/Walsh codes starting from the specified code offset. Gold code generation is centralized and can be produced for any correlation cycle. No LFSR state nor "mask" need to be specified, as the code number and offset from a global chip counter (GCC) is available. Both "block" and "serial" Gold code generation methods are preferably employed to minimize power dissipation. The 16×16 WCDMA PSC and SSC structures have programmable parameters to be specified for use in association with PSC and SSC search operations.

With continued reference to FIG. 1, the Controller 150 is responsible for actually implementing each of the CCP 100 tasks, and generating appropriate control signals for the Data Path 300. Diverse correlations can importantly be implemented simply by varying the control sequence. Downstream control and Data Path 300 pipeline stages are most preferably gated off to conserve power when no tasks are running.

Local timing reference for the CCP 100 is maintained via an external global chip counter (GCC) 162, that counts the incoming chip samples as they are written into the Input Buffers 102. This GCC 162, discussed in further detail herein below, counts modulo the length of the WCDMA long code (38400). All timing in the CCP 100 is relative to the GCC 162, including offsets used in RAKE receiver operations.

The CCP 100 uses a number of configuration tables 160, discussed in further detail herein below, to specify how it executes each of its tasks. Some tables are used globally, while others are associated with certain tasks. One configuration table 160, for example, contains the position and size of the pilot symbols for each spreading factor. Another configuration table 160 contains the Walsh codes associated with a particular finger task. Configurations are provided directly by the host processor.

Regarding the Interrupt Generator 165, there are three types of interrupts in the CCP 100. These interrupts, discussed in more detail herein below, are task-based interrupts, system interrupts, and error interrupts. Each CCP 100 task can generate at least one interrupt. When a DPE task finishes, for example, it may generate an interrupt. Each finger task can generate a number of interrupts, for example, to indicate the end of a radio slot or the reception of the TPC symbol. Task-based interrupts are mainly used by the host processor for data retrieval, but may be for other SW/HW synchronization purposes. Task-based interrupts place status information in one of four interrupt FIFO registers. Each interrupt FIFO register is tied to one of the four interrupt lines 170 coming from the CCP 100. System interrupts indicate global CCP 100 events. A task-update interrupt, for example, signals the host processor that task updates are completed. An error interrupt is generated whenever an error condition is detected.

The Task Buffer 180 contains a list of tasks that the CCP 100 executes. The Task Buffer 180 is read directly by the CCP 100 in order to determine the CCP's current tasks. The Task Buffer 180 is a ping/pong buffer with an individual control for the ping/pong status of each entry in the Task Buffer 180. Swapping from ping to pong or vice-versa occurs on a task-update boundary. A task-update interrupt tells the host processor when the transfer completes, and that the updated status bits are available for each task. This mechanism allows a synchronization between the host processor and the CCP 100 which prevents incomplete tasks being read by the CCP 100. The CCP 100 supports up to MAX_TASKS tasks in the Task Buffer 180.

Figure 4:
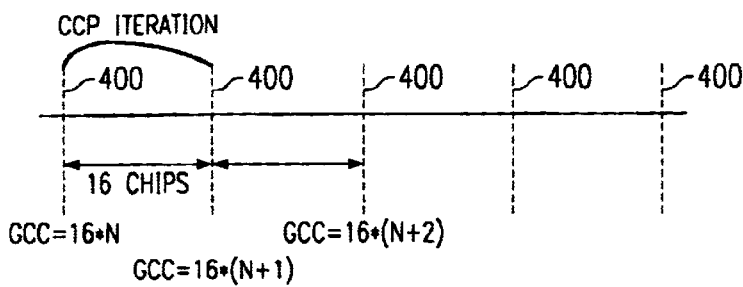
FIG. 4 illustrates a sequential CCP task cycle iteration diagram.

FIG. 4 is a diagram illustrating a plurality of CCP 100 iteration cycle boundaries 400 implemented for a modulo 16 GCC set to zero. FIG. 4 is discussed below with reference to FIGS. 1–3 to set forth in more detail, significant CCP 100 operations including, but not limited to, the concept of cycles and their management, programming the CCP 100, management of tasks, output memory, and interrupts. The CCP 100 is configured to execute host-specified tasks such that all running tasks process 16 chips of data in a CCP iteration, that lasts 16 chips as can be seen in FIG. 4. The same tasks continue the processing (of the next 16 chips of data) in the next CCP iteration. A task typically runs for many CCP iterations. There are MAX_CYCLES CCP cycles available in each CCP iteration to execute tasks. These CCP cycles can be used for finger tasks, search tasks, and the like. Extra cycles remaining will preferably prompt the CCP 100 to automatically enter a power saving state. Most tasks associated with a CCP iteration have been found to consume more than one CCP cycle. Each task including the number of cycles required by each task is described in more detail herein below. New tasks are swapped-in and/or current tasks are modified at particular CCP iteration boundaries 400 called task-update boundaries. Immediately following the task-update boundary 400, the CCP 100 swaps the tasks, as requested, into the Task Buffer 180. The CCP 100 then begins executing tasks from the first address of the Task Buffer 180. Each task-update boundary 400 is associated with a task-update interrupt event, further details of which are set forth herein below. Some tasks, e.g. LCI search, require considerably more than one iteration pass to complete, and stop when they are completed. Other tasks, e.g. Finger, run continuously until they are disabled by the host processor.

In one embodiment of the CCP 100, it is the responsibility of the software running on the host processor to manage the available MAX_CYCLES CCP cycles. If the MAX_CYCLES cycles are expended and the CCP 100 has not executed all enabled tasks, an error interrupt event is issued. A Cycle_Count register is updated every CCP iteration by the CCP 100 to indicate how many cycles were expended in the last CCP iteration to assist in cycle management, and for debugging purposes. This register will change infrequently as tasks are added or completed and is preferably read directly following a task update boundary 400 to ensure accuracy.

The Task Buffer 180 stores up to MAX_TASKS tasks that are acted on in numerical order by address. The order of placement of tasks in the Task Buffer 180 does not affect the results of a task in any way, with the exception that the PSC search task (if present), is most preferably the first task to execute, as stated herein before. As stated above, the CCP 100 processes only those tasks that are "enabled". Following execution of all enabled tasks, the CCP Data Path 300 is preferably shut down for the remaining cycles in the iteration such that reads and writes to Data Path 300 memory will cease. Although some control logic will remain operational, the foregoing will result in significant power savings within the CCP as stated above.

New tasks can most preferably be added at any time by writing them to the Task Buffer 180 and then requesting an immediate load for that task. The configuration memories and registers associated with the Configuration Tables 160 are most preferably initialized before a task that references them is programmed. A task, for one embodiment, may actively run in the first CCP iteration that follows the load of a task into the hardware side of the Task Buffer 180. Configuration parameters for a task, therefore, must be programmed before, or on the task update boundary 400 associated with loading the task.

In view of the foregoing, it is understood that having a task specification in the Task Buffer 180 is not enough for the task to execute. The task must also be enabled, preferably by requesting either a synchronous start or an immediate start. An immediate start takes effect at the task update boundary 400 on which the request is received, wherein a synchronous start takes effect at the slot number specified for that task (that is with reference to the task's own slot timing). Each task can be enabled at any task update boundary, as stated above. Most preferably, there is no fixed limit on the number of tasks in the Task Buffer 180 that may be enabled, except concerning the total cycles consumed by the ones enabled. The foregoing features apply equally well to stopping tasks. All tasks can also therefore be requested to stop immediately or synchronously at any task update boundary 400.

Modification of tasks is implemented in a manner much like loading tasks. Task parameters can be changed by writing a task specification into the Task Buffer 180 and then immediately requesting a load without changing the enable status. A task can synchronously (to its own slot timing) be reloaded. Care must be exercised when changing task parameters, as described in more detail herein below, since a new parameter may conflict with a previous parameter, thereby producing erroneous results.

The CCP 100 keeps a status register indicating the run/stop state of each task. A task is in one of four states: stopped, waiting to run, running, or waiting to stop. An "enabled" task is one that is running, waiting to run, or waiting to stop. Once a task begins executing, it will execute forever (until stopped by SW) or until a well-defined end-time. The stopping of a task can be done by software manually, or can be done by the CCP 100 automatically, as stated above, in the case of a task with a well-defined end-time. Further details regarding automatic de-activation (stopping) times are set forth herein below in association with descriptions for each task. A "disabled" task is one that is in the stopped mode.

Configuration parameters are information used by running tasks. Some parameters are expected to be changed while a task is running, but most are not. Provisions are therefore implemented to allow changes to those parameters which may need to change while a task is running so that the changes have predictable results. In one embodiment set forth herein, the parameters which have such provisions are the Finger Interrupt Table, the Finger Symbol Buffer Configuration Table, and the Walsh Table, more fully described herein below. Entries in the Finger Interrupt Table are transferred from the software side of a double buffer, to the hardware shadow of the double buffer at each task update boundary 400. Entries in the Walsh Table and Finger Symbol Buffer (FSB) Configuration Table, may be written to at any time. Pointers to the tables are used by the tasks, and it is these pointers which can be changed while the task runs with predictable behavior. Software must be implemented to avoid writing to any entry that is currently in use by the CCP 100 that can produce undefined results.

Following a power-on reset, all the CCP 100 registers are in a known state. The CCP memories have contents which are undefined, and the CCP 100 itself is not running any tasks. The CCP 100 can be configured in numerous ways to run its first tasks after the CCP clock has been started. According to one embodiment, the CCP 100 can be initialized in the following manner:

1. Configuration memories and registers are programmed (e.g. Walsh Table, Finger Symbol Buffer Configuration Table, Finger Interrupt Table, Task_Update_Cycle register, Pilot Bits Table, Interrupts, and the like);
2. Tasks are written to the Task Buffer 180;
3. Task Requests (start, load) are written to their respective registers; and
4. Start the CCP 100 via the start/continue command.

All specified task requests (start/load) will occur and the tasks will begin running at the first task update boundary 400. Importantly, the contents of all memories are undefined and must be initialized before being referenced. The entire Task Buffer 180 need not be initialized before its use. Locations which are to be used however, require initialization prior to use. All tasks are disabled at reset. Task update interrupts commence when the CCP 100 is enabled to run via a start command or by a sleep timer. The present invention is not so limited however, and it shall be understood that many other initialization procedures, techniques and sequences can also function to adequately initialize the CCP 100 under appropriate circumstances. The foregoing techniques are set forth only to exemplify operating characteristics of the CCP 100 depicted in the Figures referenced herein.

The Finger Symbol Buffer 106 according to one embodiment described in detail below with reference to FIG. 15, is managed by setting up multi-slot circular buffer areas for each de-spreader (sub-task) that uses them. The software running on the host processor has responsibility to manage these areas and to ensure the areas do not overlap. Importantly, the SW must react to interrupts in a timely way so as to always read in "safe areas." While the CCP 100 is writing to a particular address in this memory, for example, the reading of that address would result in an undefined data word being read.

Many events in the CCP 100 may cause interrupts on one of the external interrupt lines 170, as stated above. There are system interrupt events, error interrupt events, and task-based interrupt events. Each interrupt event can occur independently. As also stated above, a FIFO queuing system is implemented for the task-based interrupts, so that several pending interrupts can be held until the host processor services them as described more fully herein below.

Figure 5:
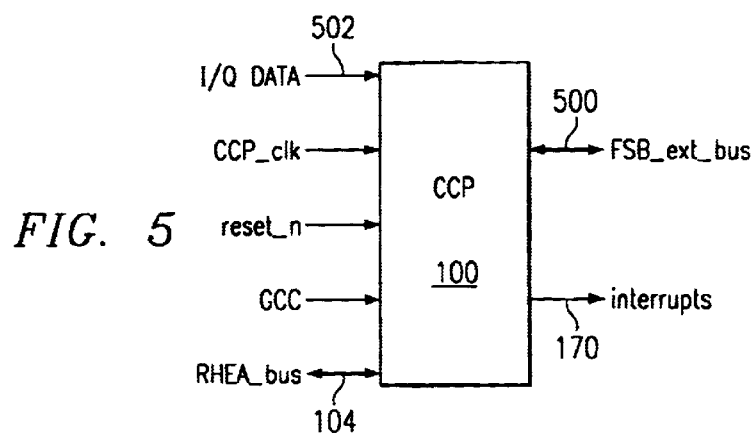
FIG. 5 illustrates external interfaces to a CCP.

FIG. 5 illustrates external interfaces to a CCP. 100. External interfaces can be seen to include a DSP Bus 104 interface, a Finger Symbol Buffer (FSB) 106 external bus 500, I/Q data inputs 502, and other control connections. A description of interface signals associated with the CCP 100 external interfaces is set forth in Table 1 below.

TABLE 1

(Interface Signal Description)

| | | |
|---|---|---|
| DSP RHEA BUS | | |
| XAD(9:0) | IN | Address bus |
| XCS(4:0) | IN | Chip Select |
| XD0(31:0) | IN | Data from RHEA bridge to peripherals |
| XDI(31:0) | OUT | Data from peripherals RHEA bridge |
| XRnW | IN | Read not Write |
| NXSTROBE(1:0) | IN | Strobe lines |
| NXREADY | OUT | Peripheral Ready to accept or to send data |
| NXSUSPEND | IN | Indicates that DSP has suspended execution For an emulation breakpoint. |
| XPERHMAS | OUT | Accessed Peripheral register size 0 => 8 bits, 1 => 16 bits |
| XMAS | IN | Memory access length 0 => 8 bits, 1 => 16 bits |
| XIDLE | IN | Idle peripheral |
| nXIRQ(11:0) | OUT | LEAD Interrupt requests |
| FSB External Bus | | |
| FSB_AD(13:0) | IN | FSB Address inputs |
| FSB_DATA(31:0) | OUT | FSB Data word |
| FSB_RD_REQ_N | IN | FSB Read request, active low |
| FSB_READY_N | OUT | FSB Data ready, active low |
| Control Signals | | |
| RESET_N | IN | Reset signal |
| Interface to System Controller | | |
| GCC[18:0] | IN | Global Chip Count, System Time Base |
| CCP_enable | IN | CCP enable |
| Bdry_16_chip | IN | 16 chip boundary |
| CCP_clk | IN | clock |
| Interface to DSP | | |
| CCP_Int_n[3:0] | OUT | Interrupts, active low |
| System_Int_n | OUT | System interrupt, active low |
| Error_Int_n | OUT | Error interrupt, active low |
| Interface to IQ Select | | |
| Ot_sample[1:0] | OUT | On-time sample number |
| Lt_sample[1:0] | OUT | Late-time sample number |
| Ot_frame[3:0] | OUT | On-time frame location, 1 of 16 chips |
| Lt_frame[3:0] | OUT | On-time frame location, 1 of 16 chips |
| Ot_data[15:0] | IN | On-time data, 16 samples, 12 bits each |
| Lt_data[15:0] | IN | Late-time data, 16 samples, 12 bits each |

FIGS. 6–47 illustrate software interface details relating to the Task Buffer 180, synchronously and asynchronously updated configuration parameters, a command set, global and interrupt status, FSB status and output data, suitable for use in association with the CCP 100. It shall be understood that all data values are oriented with the LSB at bit 0, and the MSB at the highest bit number. It shall also be understood that when a 32 bit field is read over a 16 bit bus, the address for bits 15–0 is even and precedes the address for bits 31–16. Further, all bit fields depicted as "unused" or "value immaterial" is most preferably filled with zeros to provide compatibility with other embodiments of the CCP 100.

Figure 6:
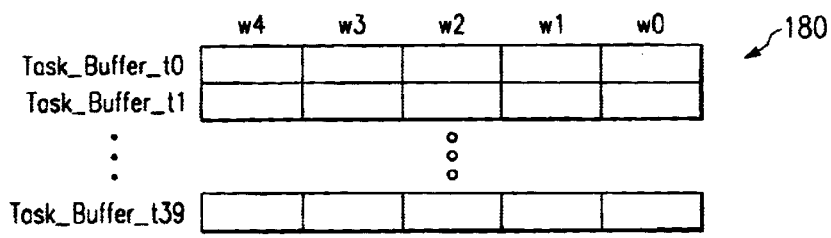
FIG. 6 illustrates a task buffer suitable for use with the CCP shown in FIG. 1.
Figure 7:
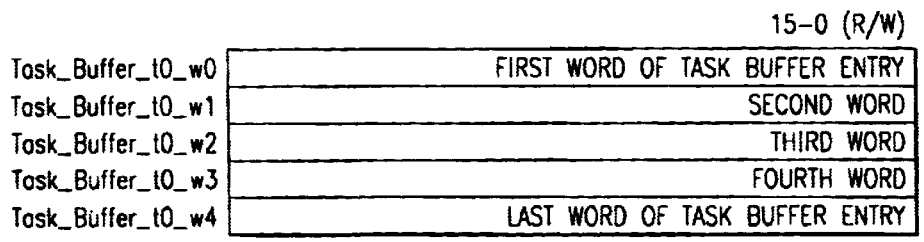
FIG. 7 illustrates task buffer entries associated with a task buffer.

FIG. 6 illustrates a Task Buffer 180 while FIG. 7 illustrates Task Buffer 180 entries suitable for use in association with the CCP 100. The Task Buffer 180 is a collection of MAX_TASKS ping/pong buffers, each of which may contain a CCP task of 90 bits (5*16). The status of each of MAX_TASKS tasks as to whether the ping or pong is available to the CCP 100 for execution, and the other available for SW loading/modification, can be controlled on an individual task basis by SW. Task formats according to one preferred embodiment are described further herein below. Entries modifiable by the SW may be read by the host processor (DSP). As stated above, configuration parameters are updated at the task update boundary 400, at which time the software-modified register is copied to a hardware-readable shadow register.

FIG. 8 illustrates entry of task request bits while FIG. 9 illustrates a task request ID register format 900 suitable for implementing in association with the CCP 100. The type of request is indicated by writing the appropriate information to the task request ID field. Each task has a task request ID register that identifies the type of request being made when a "1" is written to the corresponding task request bit. With reference now to FIG. 9, and regarding the Start/Stop Enable 902, a "1" indicates that the request includes the start/stop action identified in the Start/Stop ID bits 904, a "0" indicates no start/stop action is requested. The Start/Stop ID bits 904 are referenced by the hardware only if the Start/Stop Enable bit 902 is set ("1"). A "00" indicates an immediate start, "01" a synchronous start, "10" an immediate stop, and "11" a synchronous stop. Setting the Load/Reload Enable bit 906 to "1" indicates that the request includes a load/reload action as identified in the Load/Reload ID bit 908. A "0" indicates no load/reload action is requested. Setting the Load/Reload ID bit 908 to "0" indicates an immediate load is requested, while a "1" indicates a synchronous reload is requested. This bit is referenced by the hardware only if the Load/Reload Enable bit 906 is set ("1"). A synchronous reload implies the instruction is "enabled", and if it is not enabled, the reload will remain pending until an immediate load is requested. The Timing Adjust Enable bit(s) 910 apply only to finger tasks. Setting this bit to "1" is a request to adjust timing, whereas setting this bit to "0" is not a request to adjust timing. Timing change information is contained within the specified finger task description. The Slot # field 912 identifies the slot number for a synchronous action (synchronous start, synchronous stop, or synchronous reload) relative to the task's own frame timing. This field 912 defines the first slot to begin processing when a synchronous start is requested. When a synchronous stop is requested, this field 912 defines the first slot which is not processed (the last slot number processed is the one which precedes this slot number, modulo 15). When a synchronous reload is requested, this field 912 defines the first slot after the reload (the last slot number processed before the reload is the one which precedes this slot number, modulo 15). The fifteen slots per frame are numbered 0 through 14. The value in slot 15 in this field 912 indicates the beginning of the next slot. Any request for a given task that references this value can only commence following completion of the given task if the given task is currently being processed. Otherwise the request and the current task will both be referencing the last value written.

FIG. 10 illustrates a finger interrupt table format 1000 while FIG. 1 illustrates a finger interrupt control format 1100 that is common to each 3-bit field within the finger interrupt table 1002. The finger interrupt table 1002 associates a finger ID with a set of interrupt events. Each finger ID has a location in the table 1002 that can enable a slot interrupt, and/or TPC interrupt, and/or pilot interrupt. The size of the table 1002 is MAX_FINGERS×10 bits. The finger interrupt table 1002 is double buffered, and the contents of the table 1002, which SW writes to, are copied to the CCP 100 hardware view at the task update boundary 400. The table 1002, as viewed by the CCP 100 hardware, is readable by the host processor (DSP). Each of the 3-bit fields in a finger interrupt table 1002 entry (Slot, TPC, and Pilot Interrupt Control) depicted in FIG. 10 have a common format, as shown in FIG. 11, where the field for controlling the Pilot Interrupt 1004 is shown. The MSB 1006 controls enable status, and the 2 LSB's 1008 specify the interrupt FIFO. The Half-Slot Enable bit 1010 modifies the Slot Interrupt Control 1012 (if enabled) for half-slot (if "1") or whole-slot (if "0").

FIG. 12 illustrates a Task_Update_Cycle register 1200 that identifies how often there is a Task-Update event and that is suitable for use in association with the CCP 100. Register 1200 is implemented using a shadow register that is updated on the task update boundary 400. At reset, the value of Update_Cycle is 3 decimal. The value in this register 1200 is one less than the number of 16 chip periods in a Task_Update cycle (e.g. 3→Task Update interval is 4*16 chips).

In contrast with the foregoing synchronously updated configuration parameters, asynchronously updated configuration parameters are typically ones that are not changed often, if at all, once the CCP 100 begins its operations. Changing these parameters when not in use is not a problem (e.g. changing Walsh Table entry when no tasks are referencing the particular entry being changed).

Figure 13:
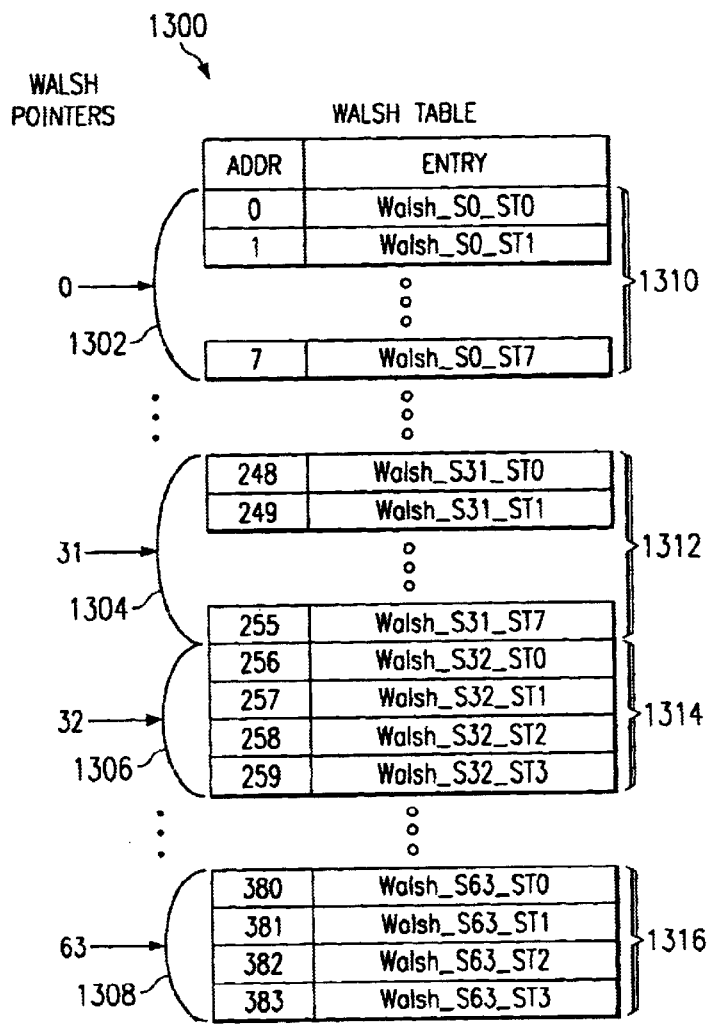
FIG. 13 illustrates a Walsh table.
Figure 14:
FIG. 14 illustrates a Walsh table entry.

FIG. 13 illustrates a Walsh Table 1300 while FIG. 14 illustrates a Walsh Table entry for a sample Walsh sub-task suitable for use in association with the CCP 100. The Walsh Table 1300 holds Walsh sub-tasks 1310, 1312, 1314, 1316. A set of Walsh sub-tasks is used by a finger or DPE task to specify how Walsh de-spreading should take place on one or more (in case of finger) Walsh channels. Each finger or DPE task has a Walsh Pointer field 1302, 1304, 1306, 1308 to specify the desired set of Walsh sub-tasks 1310–1316. Finger tasks, in addition, may specify the processing of an EOL sub-task which will support a DLL function by computing ontime, early and late energies on a particular Walsh channel. The Walsh Table 1300 is made up of TOTAL_WALSH different sections or sets, and each is configured with a fixed number of Walsh sub-tasks 1310–1316. The first NUM_WALSH8 sets of Walsh sub-tasks 1310–1312, addressed by the first Walsh pointers 0 through (NUM_WALSH8–1), may each specify up to 8 Walsh sub-tasks, and the last NUM_WALSH4 sets, addressed by Walsh pointers NUM_WALSH8 to (NUM_WALSH8+NUM_WALSH4–1), may each specify up to 4 Walsh sub-tasks 1314–1316. The TOTAL_WALSH sets of Walsh sub-tasks 1310–1316 may specify a maximum of (NUM_WALSH8*8+NUM_WALSH4*4) Walsh sub-tasks 1310–1316. The CCP 100 supports up to MAX_FINGERS finger tasks using MAX_FINGERS unique finger ID's. Each finger task requires a set of Walsh sub-tasks 1310–1316 with 1 to 8 valid entries. Finger tasks having the first (sequentially) NUM_LARGE_FINGERS finger ID's are constrained to point to a set of sub-tasks of size 8, and remaining finger ID's constrained to point to one of a set of sub-tasks of size 4. More than one finger task can point to the same Walsh sub-task set. A DPE task requires a single Walsh sub-task which can be located in any set of Walsh sub-tasks 1310–1316 as the first sub-task in that set; any Walsh pointers may be used. FIG. 13 exemplifies 64 sets of Walsh sub-tasks, with NUM_WALSH8=32 and NUM_WALSH4=32. If fewer than the maximum number of entries (8 or 4) are needed, the sub-tasks 1310–1316 must appear at the beginning of the area and be consecutive, as illustrated in FIG. 14 that exemplifies a Walsh sub-task that belongs to the fifth Walsh set (S5) and is the third Walsh sub-task (ST3).

FIG. 15 illustrates a FSB Buffer Configuration Table 1500 while FIG. 16 illustrates a table entry for the FSB Buffer Configuration Table 1500 and suitable for use in association with the CCP 100. The FSB Buffer Configuration Table 1500 is a ping/pong buffer with two entries for each finger ID/Walsh ID (de-spreader) combination, to specify where in the Finger Symbol Buffer 106 a finger and each of its Walsh channels (as specified by the Walsh ID) will output its de-spread symbols. The first NUM_LARGE_FINGERS fingers may specify up to eight Walsh ID's, and each of the remaining fingers may specify up to four Walsh ID's. Hence, there are 8* NUM_LARGE_FINGERS+4*(MAX_FINGERS–NUM_LARGE_FINGERS) entries. FIG. 15 exemplifies MAX_FINGERS=64 and NUM_LARGE_FINGERS=32. Each entry includes a start address for the first slot of data in a four-slot circular buffer and an address offset from one slot to the next slot. Start addresses and offset addresses are most preferably on even 32 bit word boundaries as discussed further herein below. The FSB Buffer Configuration Table 1500 is written to directly, with the ping and pong sides written independently. Each entry is 32 bits wide and is readable as exemplified in FIG. 16.

Figure 17:
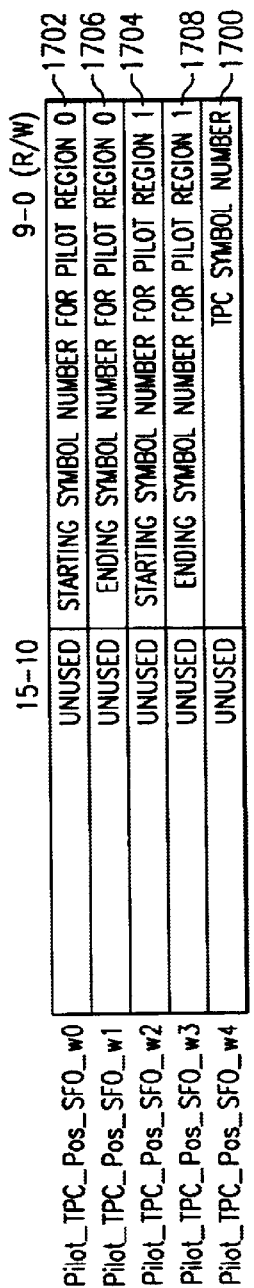
FIG. 17 illustrates a pilot-TPC position table entry format.
Figure 18:
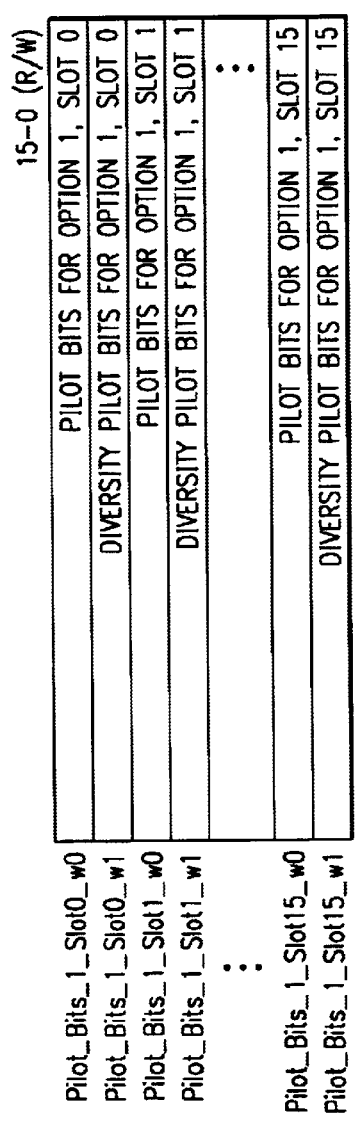

FIG. 17 illustrates a data entry format for a Pilot-TPC Position Table while FIG. 18 illustrates a data entry format for a Pilot Bits Table suitable for use in association with the CCP 100. The Pilot-TPC Position Table specifies the position of pilot and TPC symbols. There are eight (8) entries, each corresponding to a spreading factor from 4 to 512. Each entry can be seen to specify two separate locations for pilot symbols and one location for the TPC symbol. The TPC position field 1700 specifies the symbol number in a radio time slot. Each pilot position field specifies a contiguous region of symbols within the radio time slot. The region is specified using a starting position 1702, 1704 and an ending position 1706, 1708, as shown in FIG. 17. In one embodiment, the pilot regions defined are not only used to specify the location of pilot symbols as their usage depends on the task and sub-task that use them. Two defined pilot regions are therefore required for each spreading factor. The finger task selects one of these pilot regions to specify when the Finger Pilot Interrupt is activated, which is seen to be at the end of the last symbol in this region. The end of the region is important to achieve this particular task. An EOL Walsh sub-task or a DPE Walsh sub-task can select one of the pilot regions in the Pilot-TPC Position Table to define which symbol energies to accumulate. The defined region does not have to correspond exactly to the forward-link pilot symbol region, for example, when it is desirable to measure the energies of additional non-pilot symbols. Alternatively, these sub-tasks may measure the energies of symbols outside of the selected pilot symbol region.

The Pilot Bits Table depicted in FIG. 18 can be seen to have an entry for the modulation of the pilot bits (up to 16 bits per slot are supported). for each radio slot (up to 16 slots) for four different options. The common pilot bits in one embodiment (on the Common Pilot Channel CPICH in IMT2000-DS) need not be entered in the Pilot Bits Table, as they are available as option 0, and their values are hardwired. The pilot bits for the diversity antenna are stored along with the pilot bits for the first antenna. The size of the Table is (3×16) entries by 32 bits. The Pilot Bits Table is used by finger EOL and DPE tasks. Each pilot bits entry encodes one slot and contains 16 bits for each antenna. In WCDMA, each pair of bits is a complex pilot symbol. The first pair of bits in the slot resides in bits 15 and 14, with bit 15 being the in-phase bit and bit 14 being the quadrature-phase bit. The next pair of bits is in bits 13 and 12, and so on. The number of pilot bits in an actual radio slot may be less than 16, in which case the first n bits are used, where n is the total number of bits required. Each task which requires the use of the Pilot Bits Table will specify the pilot bits option number, along with a pilot region, which together indicate the number of pilots and their values.

Figure 19:
FIG. 19 illustrates an external interrupt enable register format.

An external interrupt control register controls the enabling of FIFO, error and system interrupts to the external interrupt lines 170. FIG. 19 illustrates one format suitable for use in association with external interrupt enable registers.

Figure 20:
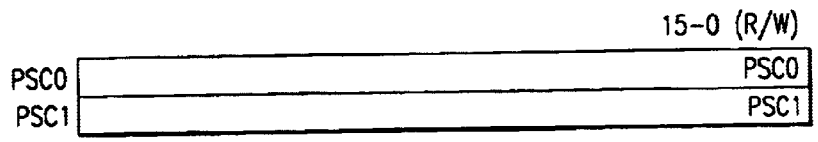
FIG. 20 illustrates a PSC register format.

FIG. 20 illustrates a PSC register format for a PSC register suitable for use with the CCP 100 in which a first search code has a hierarchical structure defined by the Kronecker product of two 16-bit sequences, PSC=PSC0 X PSC1, where "X" denotes the Kronecker product.

Figure 21:
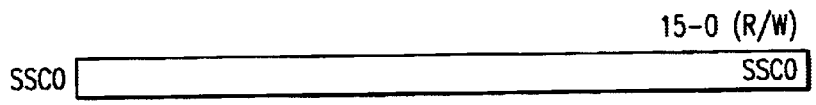
FIG. 21 illustrates a SSC register format.

FIG. 21 illustrates one SSC register format for a SSC register suitable for use with the CCP 100 in which the secondary search code has a hierarchical structure by the Kronecker product of two 16-bit sequences, SSC=SSC0 X SSC1 followed by the modulo-2 addition with a Hadamard sequence, where "X" denotes the Kronecker product. The SSC search task uses SSC0, post-processing with SSC1; and the Hadamard sequence is left as a task for software or special purpose hardware.

Figure 22:
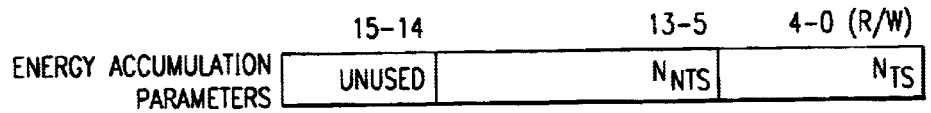
FIG. 22 illustrates DPE and LCI energy accumulation parameters.

FIG. 22 illustrates DPE and LCI energy accumulation parameters suitable for use in association with the CCP 100 in which DPE and LCI tasks output results once, after measuring $N_{NTS}*N_{TS}$ radio slots of data. When pilot symbols are accumulated coherently for longer than a symbol, NTS controls the number of radio time slots of coherent accumulation. $N_{TS}$ can have any value between 0 and 31 (unlike the restrictions for the EOL sub-task), where 0 means 0.4 slots, the others being complete slots. When pilot symbols are accumulated with a coherent length of one symbol, $N_{TS}$ is ignored, and results are output after $N_{NTS}$ time slots. One embodiment of the CCP 100 Data Path 300 is designed for the accumulation of up to 8 frames. Exceeding this range with any combination of these parameters for this Data Path 300 is expected to result in errors due to overflow. Tables are preferably configured for DPE and LCI parameter sizes of MAX_DPE×14 bits and MAX_LCI×14 bits respectively, wherein the parameters for each DPE and LCI search ID are stored in a separate entry as shown in FIG. 22.

Figure 23:
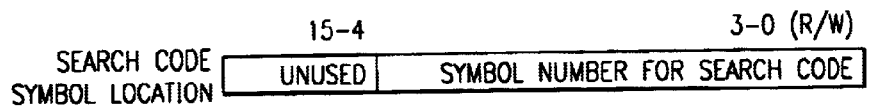
FIG. 23 illustrates a search code symbol location register.

FIG. 23 illustrates a search code symbol location register suitable for use with the CCP 100 and specifies which symbol of a Perch channel contains the primary and secondary search codes (PSC and SSC). Values range between 0 and 9 for one preferred embodiment.

Figure 24:
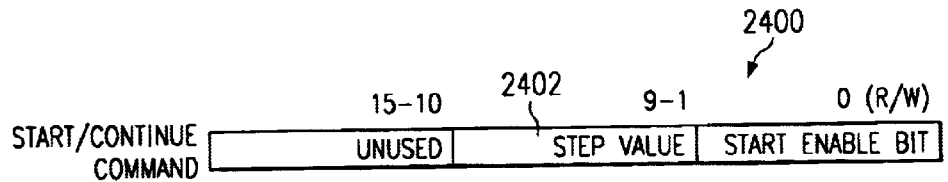
FIG. 24 illustrates a start/continue command.

FIG. 24 illustrates a start/continue command register 2400 suitable for use in association with the CCP Controller 150, wherein the start/halt command is used to start the CCP 100 following power-on as discussed above. The CCP 100 will always start and stop on a 16-chip boundary 400 of the GCC, and the step value 2402 defines the number of cycles to run before stopping, wherein a value of "0" indicates continuous run mode.

Figure 25:
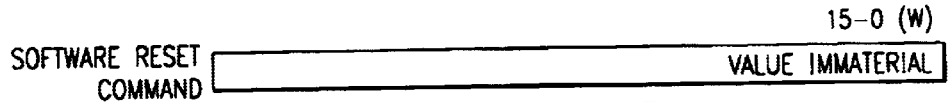
FIG. 25 illustrates a software reset command.

FIG. 25 illustrates a software reset command register suitable for use with the CCP 100. When the CCP 100 is stopped or halted, a software reset command will reset all internal registers and states to the power-on reset configuration discussed herein before. This command is preferably not intended to be used while the CCP 100 is executing.

FIGS. 26–39 illustrate various global and interrupt status registers in which a synchronizer circuit most preferably allows the host processor (DSP) to read accurate values from these registers. Synchronizer circuits are well known to those skilled in the data processor art and so therefore will not be discussed in further detail herein to preserve clarity and brevity.

Figure 26:
FIG. 26 illustrates a CCP$_{13}$ Status register format.
Figure 38:
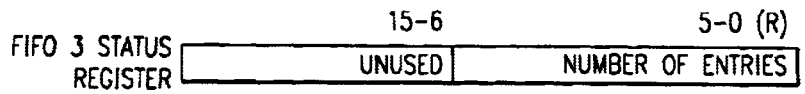
FIG. 38 illustrates a FIFO 3 status.

Looking now at FIG. 26, one preferred embodiment of a CCP status register format is illustrated. The CCP status register preferably contains a PSC Buffer status bit wherein a "1" indicates the PSC Buffer 118 is accessible only by the CCP 100 and a "0" indicates the PSC Buffer 118 is accessible by the host processor (DSP). The CCP status register also preferably contains a CCP run/stop status bit wherein a "1" indicates the CCP 100 is running and a "0" indicates the CCP 100 is stopped.

FIG. 27 illustrates run/stop status registers suitable for use in association with the Task Buffer 180 in which the host processor can read the current run/stop status for all tasks within the Task Buffer 180. Each task can be seen to have a two bit field which encodes the run/stop status and wherein "00" indicates "stopped"; "01" indicates "waiting to run"; "10" indicates "running"; and "11"indicates "waiting to stop."

FIG. 28 illustrates ping/pong status registers suitable for use in association with the Task Buffer 180 in which each task can be seen to have a two bit field that encodes the ping/pong status and wherein "00"indicates "HW is reading ping"; "01" indicates "HW is reading ping, waiting to pong"; "10" indicates "HW is reading pong"; and "11" indicates "HW is reading pong, waiting to ping."

FIG. 29 illustrates a task update time register 2900 suitable for use in association with the CCP 100 in which the Task_Update_Timestamp register 2902 captures the GCC value of the most recent task update boundary 400.

FIG. 30 illustrates a cycle count register suitable for use in association with the CCP 100 in which the cycle count register captures the number of cycles expended in the most recent CCP iteration such as depicted in FIG. 4. The cycle count register is most preferably updated every CCP iteration.

FIG. 31 illustrates a GCC count register suitable for use in association with the CCP Controller 150. The GCC count register captures the current GCC value, most preferably updated once per chip. Most preferably, the 4 MSB's indicate the GCC local slot number and the remaining LSB's indicate the remainder of the count in chips.

FIG. 32 illustrates one embodiment of an interrupt error event status register suitable for use in association with the CCP 100. Preferably, a cycles exceeded error bit is set at "1" if the number of cycles attempted in an iteration is greater than the maximum (e.g. 320), or "0" otherwise. Interrupt FIFO overflow error bits are preferably implemented such that one bit for each of the four interrupt FIFO's discussed herein before is set at "1" if the corresponding FIFO has overflowed, or "0" otherwise.

FIG. 33 illustrates one embodiment of an interrupt system event status register 3300 suitable for use in association with the CCP 100. Reading the interrupt system event status register 3300 most preferably clears the system interrupt event wherein a Task Update Event bit 3302 is set at "1" if the Task_Update event has occurred, or "0" otherwise.

FIG. 34 illustrates one embodiment of a FIFO status register showing the empty/non-empty status for each interrupt FIFO, and that is suitable for use with the CCP 100. When a particular FIFO is not empty, its FIFO empty status bit is preferably set at "1." The status bit is most preferably cleared when all FIFO contents have been read. FIGS. 35–38 illustrate FIFO status registers in which each FIFO status register contains the number of active entries currently in the FIFO (which have not been read).

Figure 39:
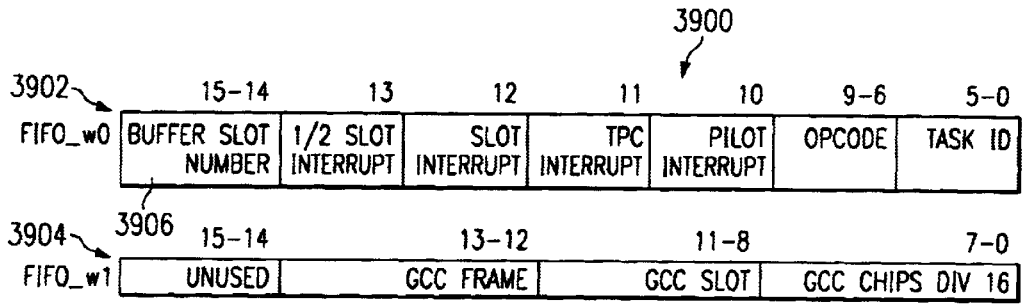
FIG. 39 illustrates a FIFO content format.

FIG. 39 illustrates a content format associated with one embodiment of a FIFO 3900 and suitable for use with the CCP 100. FIFO contents can be seen to have two words each 3902, 3904, and are preferably read out at one memory location, one after the other. When the second word (FIFO_w1) 3904 is read, the FIFO 3900 hardware increments its internal read pointer (which points to a 32-bit entry). All zeros are returned when there are no active entries to be read. A finger task can issue multiple and simultaneous interrupt events for the half slot, full slot, TPC, and pilot, which are indicated by individual status bits in the first word 3902. The buffer slot number field 3906 indicates which slot in the multi-slot circular buffer that a finger task or SSC search task has placed its data (most preferably, the buffer slot number field is valid when the slot interrupt bit field is set for a finger task and for all SSC search task interrupts). The second word 3094 of the FIFO can be seen to record the GCC value when a specific event has occurred.

Figure 40:
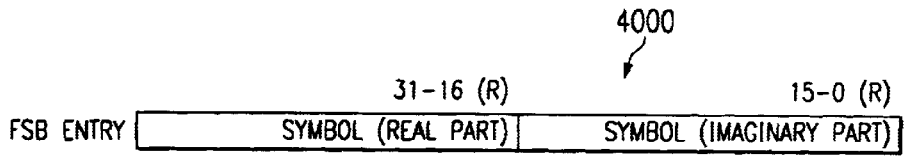
FIG. 40 illustrates a finger symbol buffer (FSB) format.
Figure 41:
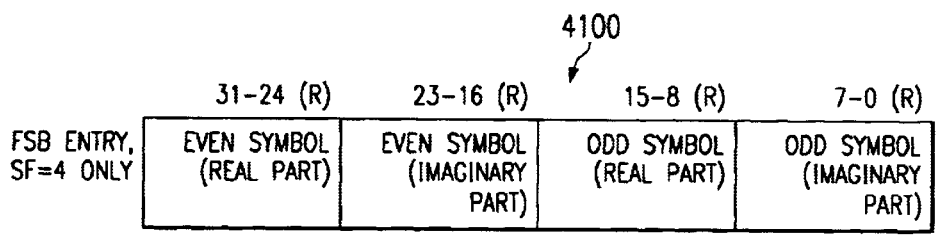
FIG. 41 illustrates a FSB format, SF=4 only.

FIG. 40 illustrates one embodiment of a Finger Symbol Buffer register format 4000 when a finger task has a spreading factor between 8 and 512 while FIG. 41 illustrates a FSB register format 4100 associated with a finger task having a spreading factor of 4. The FSB 4000 holds 18 k 32-bit words and is divided into multi-slot circular buffers for each finger ID/Walsh ID combination. The location of each circular buffer is defined in a FSB Configuration Table, discussed herein below. The FSB 4000, 4100 is most preferably accessed by software through a hardware symbol processor (HSP) or maximal-ratio combining (MRC) module, via a page register using techniques familiar to those skilled in the data processing art.

Figure 42:
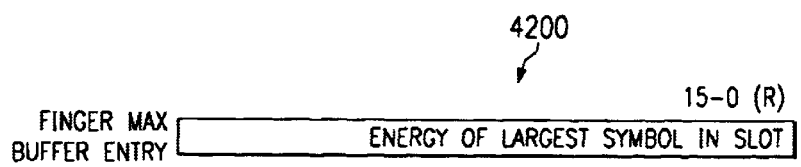
FIG. 42 illustrates a finger max buffer format.

FIG. 42 illustrates a register format for a finger max buffer 4200 according to one embodiment that is suitable for use with the CCP 100. The finger max buffer 4200 is a four slot circular buffer that stores the largest energy value within a slot for a particular finger ID/Walsh ID (de-spreader) combination. Each energy value is 16-bits. There are most preferably 8*NUM_LARGE_FINGERS+4*(MAX_FINGERS–NUM_LARGE_FINGERS) four slot circular buffers. These four slot circular buffers are arranged in the same order as the FSB Configuration Buffer 106, and the four slot energies are grouped together. The buffer number (0–3) used for a particular slot is the same as the buffer number used by the FSB 106 to store symbols, and the finger task interrupt information provides this buffer number in the FIFO entry.

FIG. 43 illustrates one embodiment of a EOL Buffer memory map 4300 suitable for use in association with the EOL Buffer 116. The EOL Buffer 116 stores early, ontime, and late energy measurement data associated with finger tasks as stated above. Results are dumped into the EOL Buffer 116 once per frame—at the end of each frame—and most preferably are retrieved by the host processor (e.g., DSP) before the next frame boundary. When new results are ready, they may be read on the DSP Bus 104 directly by the host processor or by a DSP DMA controller associated with the host processor. Outputs, as seen in FIG. 43, are indexed by the finger ID.

FIG. 44 illustrates one embodiment of a DPE Buffer memory map suitable for use in association with the DPE Buffer 114. Output results from the DPE task are placed in the DPE Buffer 114, which holds up to MAX_DPE*32*2 energy values. The DPE Buffer 114 is partitioned into equal-sized blocks, each with 32 locations, wherein a location holds an ontime energy and (optionally) a late-time energy for an offset within a specific search window. A DPE task with a certain DPE search ID outputs its results starting at the same block number in the DPE Buffer 114. If the search window is less than or equal to 32 chips, for a DPE task,. then all of its results are placed in one block of the DPE/LCI Buffer 114, 115. If the search window is more than 32, the results are placed in the next adjacent blocks of the DPE/LCE Buffer 114, 115. Results are stored sequentially from the starting to the ending offset.

FIG. 45 illustrates a LCI Buffer memory map suitable for use in association with the LCI Buffer 115. Output results from the LCI tasks are placed in the LCI Buffer 115, which holds MAX_LCI pairs of energy values. The LCI Buffer 115 is partitioned into equal-sized blocks, each block with 8 locations, wherein a location holds an ontime energy and (optionally) a late-time energy for a long code. An LCI task with a certain LCI search ID outputs its results starting at the same block number in the LCI Buffer 115. The LCI task outputs a pair of energies for each of up to 8 codes being identified.

FIG. 46 illustrates a PSC search buffer memory map suitable for use in association with the PSC Search Buffer 118, wherein the PSC Search Buffer 118 contains 5120 words, one for every ½-chip in a WCDMA radio time slot. The first location can be seen to contain the energy value at zero offset (modulo 2560 chips) from GCC, the next at ½-chip, and so on. The PSC Search Buffer 118 is most preferably accessible to the host processor only when the PSC search task is not active. Accessibility is indicated by the PSC Buffer status bit in the CCP status register discussed herein above with reference to FIG. 26.

FIG. 47 illustrates a secondary search code buffer format suitable for use in association with the SSC Search Buffer 140 discussed herein before with reference also to FIG. 21. The SSC Search Buffer 140 can be seen to contain 1024 32-bit words arranged as eight 4-slot circular buffers, one for each SSC ID. There are 16 symbols per slot of each the PSC and SSC, wherein complex symbols for both the PSC and SSC are stored in the buffer. The first half of the SSC Search Buffer 140, comprising 512 32-bit words, contain the SSC symbols and the second half the PSC symbols.

The availability of task sets, how tasks are transferred into the CCP 100, when tasks begin executing and when tasks are complete are now set forth below with reference to FIGS. 48–60 to more completely describe 1) finger tasks, including support for EOL measurement, 2) DPE ("multipath search"), 3) PSC search ("stage 1 search" ), 4) SSC search ("stage 2 search"), 5) LCI search ("stage 3 search"), and 6) Paging Indication Channel (PICH) De-spreading.

FIG. 48 is a diagram illustrating task update timing according to one embodiment of the present invention and that is suitable for use in association with the CCP 100. As stated above, the CCP 100 includes a ping/pong Task Buffer 180 that can contain up to MAX_TASKS tasks. Tasks are written to the Task Buffer 180 by software, and after the tasks are loaded into the hardware side (firmware), they can be executed by the CCP 100. The loading is requested by software using the Task Request bits along with a Task Request ID, and occurs at the next task update boundary 400 following the write of the request. The foregoing is the basic mechanism for loading tasks into the CCP 100 for execution. When the Task_Update transfer takes place, the Task_Update_Timestamp register 2902 is loaded with the current value of the global chip counter (GCC) as also described herein above. The time interval for the Task_Update (task update) boundary 400 is most preferably programmable and for one embodiment described herein, is required to be set at a multiple of the CCP iteration (16 chip periods) such as illustrated in FIG. 48. This multiple of 16 chips is stored in the double-buffered shadow register Task_Update_Cycle, which is updated by copying the software side of the register to the hardware side on every Task_Update (task update) boundary 400. At reset, the value of Task-Update_Cycle is 4, but could have other values as well. The contents of the Task Buffer 180 may be read by the host processor as stated above. After the Task_Update interrupt 4802 occurs, which signals the completion of the Task_Update actions, reading the Task Buffer 180 will not result in a synchronization problem. Following a power-on reset, the contents of the Task Buffer 180 are undefined, as stated herein before, the enable status bits of all tasks in the execution buffer are disabled, and all Task Request bits are cleared. Tasks will begin being executed once the tasks are written to the Task Buffer 180, Task Requests to load and start are made, and the CCP 100 is started.

Figure 49:
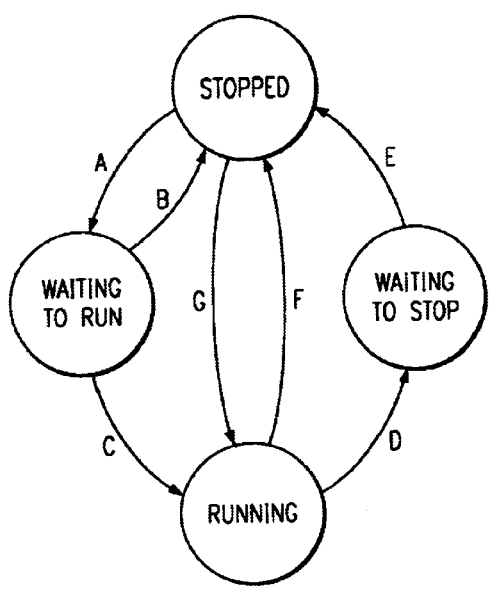
FIG. 49 a task start/stop state transition diagram.

FIG. 49 illustrates a task start/stop state transition diagram according to one embodiment that is suitable for use in association with the CCP 100. Most tasks preferably have an ID associated with them and that is used by the CCP 100 to identify which configuration parameters are associated with the tasks and where the results of the tasks are to be placed. Importantly, the same ID should not be duplicated on two tasks of the same type which may run simultaneously since the results of such a situation are not necessarily defined for each embodiment of the CCP 100. One embodiment of the CCP 100 implements four types of task-level ID's, including finger ID, DPE search ID, LCI search ID and SSC ID. The finger ID is used by finger tasks and by the PICH de-spreader task described above. The finger ID of a task is used to index coherent scratch memory 310, internal scratch memory 312, the FSB Configuration Table 1500, FSB status, the Finger Interrupt Table, and the EOL Buffer 116. The finger ID is also used to distinguish different finger task events at the interrupt FIFO's. The DPE search ID is used by DPE tasks, wherein any running DPE tasks are required to use unique DPE search ID's. The search ID of a DPE task is used to index internal scratch memories 310, 312 and the DPE Buffer 114. It is also used to distinguish different DPE task events at the interrupt FIFO's. The LCI search ID is used by LCI tasks, wherein any running LCI tasks are required to use unique LCI search ID's. The search ID of an LCI task is used to index internal scratch memories 310, 312 and the LCI Buffer 115. It is also used to distinguish different LCI task events at the interrupt FIFO's. The SSC ID is used to distinguish different SSC search task events at the interrupt FIFO's and to index the SSC Buffer 140. Further, each Walsh sub-task within each Walsh set has a unique Walsh ID to distinguish itself from other Walsh sub-tasks, as discussed further herein below.

The CCP 100, as stated above, maintains a MAX_TASKS-bit Task Start/Stop Status register that reflects which tasks are "enabled." Enabled tasks are those that are "running", "waiting to run", or "waiting to stop." The CCP 100 only fetches a task if it is enabled. Therefore, disabled tasks. are skipped over and do not expend CCP cycles. The CCP 100, according to one preferred embodiment, can autonomously disable/stop tasks that have completed, including PSC search, DPE, LCI and PICH. All other tasks are most preferably stopped by the host processor. The CCP 100 cannot autonomously start any tasks. The host processor generally requests the starting and stopping of CCP 100 tasks at the task update boundary 400, and as stated herein before, all tasks may be started or stopped on an individual basis. The host processor sets the appropriate Task Request bit and writes the type of request to the Task Request register for the task. A task that is enabled may or may not be actively running as it depends on whether its start time has been reached. If the start time has not been reached, then the enabled task is "waiting to run," and one 100 cycle is expended per task. A task that is "running" or "waiting to stop" is actively running and may consume several CCP 100 cycles.

With continued reference now to FIG. 49, and keeping the above rules in mind for the embodiments disclosed herein, the CCP 100 will transition from a "stopped" to a "waiting to run" state when a synchronous start is requested as represented by transition "A." The CCP 100 will transition from a "waiting to run" state to a "stopped" state when an immediate stop is requested as represented by transition "B." The CCP 100 will transition from a "waiting to run" state to a "running" state when the slot activation time arrives, as represented by transition "C." The CCP 100 will transition from a "running" state to a "waiting to stop" state when a synchronous stop is requested, as represented by transition "D." The CCP 100 will transition from a "waiting to stop" state to a "stopped" state when either the slot activation time arrives or an immediate stop is requested, as represented by transition "E." The CCP 100 will transition from a "running" to a "stopped" state, as represented by transition "F" when an immediate stop is requested or a task finally completes. Finally, the CCP 100 will transition from a "stopped" state to a "running" state, as represented by transition "G", when an immediate start is requested.

The finger task has been found to require periodic adjustments to its timing due to the nature of the channel. This process is accomplished, as described below, using the timing adjust feature in the foregoing Task Request/Task Request ID registers, and begins by first writing the complete new finger task information to the Task Buffer 180, including changes to sample number, to the timing adjust direction bits, and to the frame offset (if any). The Task Request ID information is next written to the appropriate ID register, including setting the Timing Adjust Enable, Load Enable, and Load Immediate bits. Finally, the appropriate bit is set in the Task Request register such as discussed herein above with reference to FIG. 8. Infrequently, timing adjustments were found to force the CCP 100 to de-spread 32 chips at once, rather than 16 chips. The Data Path 300 was found, in most situations, to accommodate the extra symbols or partial symbols in every respect. The maximum symbol energy in one embodiment however, was found not to take into account the extra 16 chips when the spreading factor was either 4 or 8.

A task most preferably can be synchronously reconfigured with reference to its own slot/frame timing. This feature can be used to support compressed mode, described herein below, as well as other synchronous reconfigurations. A task can preferably start, stop, or reload its configuration on slot boundaries, as discussed above, by requesting the appropriate action for that task and identifying the slot boundary for that action to occur. If a Walsh table needs synchronous modification, a new Walsh pointer and new Walsh entry should preferably be reloaded. Similarly, if a FSB Configuration Table 1500 entry needs modification, the FSB Configuration (FSBC) ping/pong entry for that task, which is not in use, should preferably be modified and reloaded.

Figure 50:
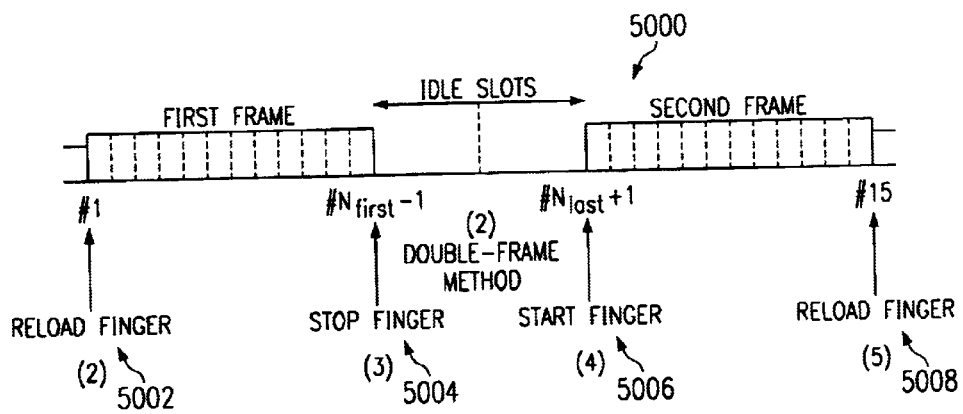
FIG. 50 illustrates finger modifications in compressed mode.

FIG. 50 illustrates a finger modification technique 5000 in compressed mode according to one embodiment of the present invention and that is suitable for use with the CCP 100. When a finger goes in and out of compressed mode, it may need to allocate additional memory to accommodate the doubling of the number of symbols with the reduction of spreading factor (SF). The unused ping/pong FSB Configuration Table 1500 entry may be modified, and the finger task reloaded so that the new FSB configuration is referenced. A technique according to one embodiment is summarized below to exemplify finger modification during compressed mode.

1) Set finger nominal conditions, nominal SF, and start the finger;
2) When notified of compressed mode during the last normal frame, write a new task description to the Task Buffer 180 which contains the compressed-mode information to be reloaded as its task description at the end of slot 14 (15$^{th}$ slot), including change of SF, Walsh pointer, and FSB configuration pointer as necessary. Write a Task Request to synchronously reload the task at the end of slot 14 (5002);
3) After the swap described in step 2 has occurred (and its slot ID is no longer needed), write a Task Request to synchronously stop the task at the end of the appropriate slot (5004);
4) After the task stops (and its slot ID is no longer needed), write a Task Request to synchronously start the task (again) at the appropriate slot (5006). (The old task description is ready to run again with no modifications required); and
5) After the task starts, write a Task Request to synchronously reload the task (back to the nominal conditions) at the end of slot 14 (15$^{th}$ slot) 5008. (The original, nominal task description is waiting in the software side of the Task Buffer 180, ready to run again with no modifications required).

All CCP 100 tasks can be started immediately, as stated above, on the task update boundary 400 at which the request is made, or synchronously to its own slot timing. The starting slot may be radio slot 0 through 14 or the next radio slot (signified by using slot 15). According to one embodiment, a task that is "waiting to run" expends one CCP 100 cycle until it enters the "running" state, at which time it uses the number of CCP 100 cycles determined by its specifications. Most preferably, the DPE, PCI, LCI and PICH tasks are started on a slot boundary to ensure proper operation. It shall be understood that in some situations, an immediate start of a finger task may be desirable; however, the EOL data in this situation will not be correct until after the completion of the first full frame.

It shall be further understood that some tasks execute without end, while other tasks have well defined end times. According to one embodiment, finger and SSC tasks are continuous while DPE, PSC, LCI and PICH tasks are one-shot tasks. These tasks are now described in more detail below with reference to FIGS. 51–60, to further exemplify functional capabilities and operational characteristics for one embodiment of the CCP 100. It shall be understood that other embodiments of the CCP 100 can also be formulated, for example, by setting all "unused" bit fields to zero to provide for compatibility with specific other embodiments.

The finger task, as stated herein before, is used for demodulating fingers and EOL measurement (DLL support). De-spread finger symbols are stored in the Finger Symbol Buffer 106 and EOL measurements are output to the EOL Buffer 116. The finger task can activate up to three interrupts including pilot, TPC and End-of-slot. These interrupts are enabled and specified using the Finger Interrupt Table 1002 described in reference to FIG. 10. EOL results are output once per frame; and since the finger tasks have no stored history, results are based on the current radio slot number. This means that if a finger is started at other than a frame boundary, it will become re-synchronized on the next frame boundary. After completing the first full frame, the EOL results will then be correct. (However, symbol results will be immediately valid). Regarding EOL measurements, the number of time-slots to coherently accumulate the pilot may be $N_{TS}$=0.4, 1, 2, 3, 5, 7 and 15. Thus, there are round-down (15/$N_{TS}$) energy accumulations per frame. If $N_{TS}$ does not divide into 15, the last fractional remaining (15/$N_{TS}$) round-down (15/$N_{TS}$) slots of pilots in the frame are not used in the energy accumulation. The slot interrupt of the finger task is intended to be used to service the FSB 106, retrieving a slot of symbols which have been completed. The information stored in the interrupt FIFO discussed above in reference to FIGS. 32–39, includes the buffer slot number to assist in identifying the location of the completed symbols. Since there are 15 slots per frame, the first slot of data processed after a finger task begins running will not necessarily be in the first slot of the multi-slot circular buffer defined in its FSB configuration entry. The host processor therefore most preferably obtains this information from the interrupt FIFO. After the first slot of information is stored, the subsequent slots are stored as would be expected in a circular buffer arrangement. The maximum energy value of each Finger ID/Walsh ID combination is dumped, once per slot, into a four slot circular buffer (Finger Max Buffer 4200) to assist in combining RAKE symbols.

Figure 51:
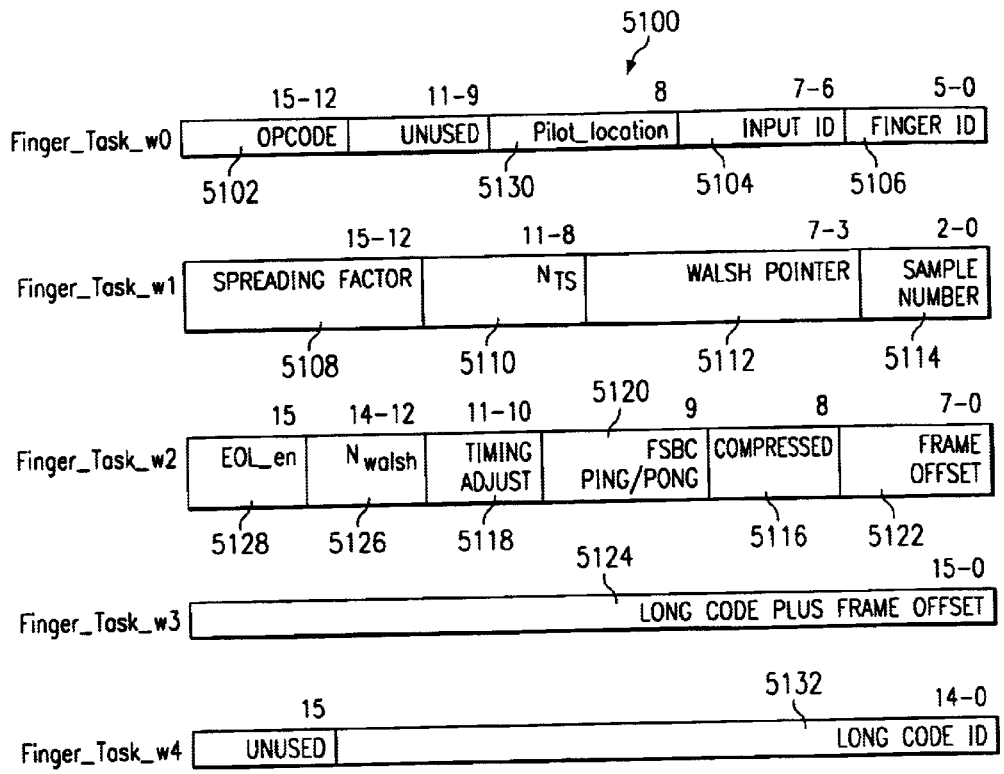
FIG. 51 illustrates a finger task format.

FIG. 51 illustrates a finger task buffer 5100 formatted according to one preferred embodiment that is suitable for use in association with the CCP 100. The finger task can be seen to have a task opcode 5102 (e.g., 0100). The finger task also includes an Input ID 5104 that operates to select a particular input buffer 102 of I/Q data 302 to process. A Finger ID 5106 is a user defined field that contains a unique identification number for all finger tasks. A spreading factor 5108 (e.g., 4, 8, 16, 32, 64, 128, 256, 512), is mapped in order to bit values "000" through "111." The $N_{TS}$ field 5110 (pertains to EOL processing only) is used to implement the number of time-slots to coherently accumulate the pilot, if coherent accumulation is chosen for EOL. The $N_{TS}$ field 5110, according to one embodiment, is limited to the values shown in Table 2 below.

TABLE 2

| ($N_{TS}$ field values) | |
|---|---|
| $N_{TS}$ | Coherent length (time slots) |
| "0000" | 0.4 |
| "0001" | 1 |
| "0010" | 2 |
| "0011" | 3 |
| "010X" | 5 |
| "011X" | 7 |
| "1XXX" | 15 |

A Walsh Pointer 5112 selects one of 32 sets of Walsh sub-tasks in the Walsh Table 1300. A Sample #5114 is used to select which sub-chip samples to process. A Compressed bit 5116 is set at "1" to indicate the finger is in compressed mode, which effects EOL processing. If the finger is starting, then the coherent and non-coherent accumulations are cleared. While the finger is running, the running non-coherent sum is dumped each time a new computation is completed. Timing_Adjust bits 5118 reflect a change in sampling time for the finger task. The options include no change and +/−delta, where delta is one sub-sample of a chip. The timing update is not reflected in the sample field of the task; instead the information is stored internally to the CCP 100. Values for delta may be "00" representing no change, "01" representing +1 sub-chip sample adjustment (to later sample), and "1X" representing −1 sub-chip sample adjustment (to earlier sample). A Task Timing Adjust Request bit must be set for the task, and any changes to the finger task's sampling time and long code offset fields of the task description written to the Task Buffer 180 must be swapped-in to correctly adjust a specific finger task timing. The Timing Adjust Request bit informs the CCP 100 of the changes to sampling time and long-code offset of the finger task that have happened so that it could modify its internal processing accordingly. It can be seen that if changes to either the sampling time or long-code offset are made, and a Task Timing Adjust Request not made, the finger task may output erroneous results and trigger interrupts at incorrect times. An FSBC ping/pong bit 5120 is set at "0" to use the ping side of the FSB Configuration Table 1500 to determine where to output symbols, and is set at "1" to use the pong side of the FSB Configuration Table 1500. A Frame Offset field 5122 specifies the offset of the frame with respect to the start of the Long Code. This will most preferably always be a multiple of 256 chips, so the field 5122 specifies the multiple of 256 chips from the Long Code offset. The start of the frame most preferably always follows the start of the Long Code, so the field 5122 is specifying how much later (unsigned). A Long code plus Frame Offset field 5124 specifies the offset, with respect to the global chip count (GCC), at which the frame begins. The four MSB's specify the offset in radio time slots, and the remaining LSB's specify the additional sub-slot in chips, as stated herein above. A field of $N_{walsh}$ bits 5126 represent the number of active Walsh sub-tasks minus one. This parameter specifies that the first $N_{walsh}+1$ Walsh sub-tasks are all active. For finger tasks with finger ID's greater than or equal to NUM__LARGE__FINGERS, this field 5126 is limited to "000", "001", "010" and "011." The EOL__en field bits 5128 specify if one of the Walsh sub-tasks is an EOL Walsh sub-task. Setting EOL__en field bits to "1" specifies the first Walsh sub-task must be the EOL Walsh sub-task, wherein EOL processing is decimated by 4 when the spreading factor is 4, and decimated by 2 when the spreading factor is 8 (a limitation that applies only to DPCCH, not CPICH) according to one preferred embodiment of the invention. A Pilot__location bit 5130 directs the CCP 100 to select-pilot region 0 or 1 from the Pilot-TPC Position Table discussed above with reference to FIG. 17, for use in the determination of a pilot interrupt for the finger task (the EOL processing may use a different pilot location, that is specified in association with a Walsh sub-task). Finally, a Long Code ID field 5132 specifies Gold code used for long-code scrambling (0–24, 575). The finger task requires a number of cycles equal to the number of non-EOL sub-tasks plus the number of cycles required for an EOL Walsh sub-task (only one allowed per finger task), wherein an EOL Walsh sub-task takes three cycles according to one preferred embodiment.

Figure 52:
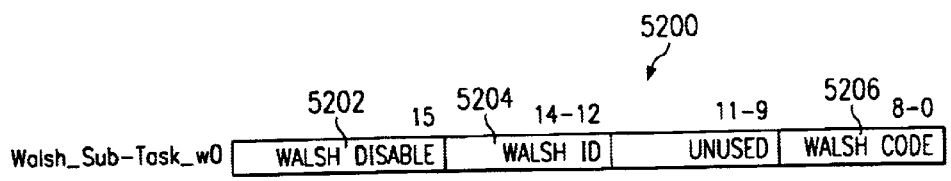
FIG. 52 illustrates a Walsh sub-task format for finger non-EOL Walsh entries.
Figure 53:
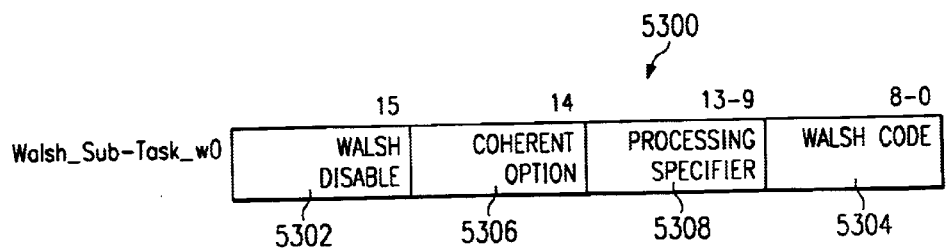
FIG. 53 illustrates a Walsh sub-task format for EOL, DPE.

FIG. 52 illustrates a Walsh sub-task format 5200 suitable to specify finger non-EOL Walsh entries in the Walsh Table 1300 and FIG. 53 illustrates a Walsh sub-task format 5300 suitable to specify finger EOL and DPE task entries in the Walsh Table 1300. Entries in the Walsh Table 1300 are used primarily for finger and DPE tasks. An EOL Walsh sub-task is most preferably required to be at the first location when there is an EOL Walsh sub-task. Two options most preferably provide for fewer than the maximum number of entries (8 or 4). The first option requires the Walsh sub-tasks to appear at the beginning of the Walsh set and be consecutive, wherein the $N_{walsh}$ field 5126 is set to the appropriate size. The second option is to specify that any Walsh sub-task that is not used in the first $N_{walsh}$ field 5126 must have its Walsh disable bit set to indicate that it is disabled. A drawback to the second option is that a cycle will be expended for each of the $N_{walsh}$ sub-tasks, even when a sub-task is disabled. Walsh sub-tasks, as stated herein before, are most preferably operated in consecutive address order within a set.

With continued reference now to FIG. 52, the Walsh sub-task parameters for non-EOL finger tasks can be seen to include a Walsh disable bit 5202 that specifies if an associated Walsh sub-task is enabled or disabled, wherein a Walsh disable bit 5202 that is set at "1" disables the associated Walsh sub-task. A Walsh ID 5204 is a user defined field that is unique in a particular Walsh sub-task set of the Walsh Table 1300. A Walsh Id 5204 may preferably be reused in other Walsh sub-task sets in the Walsh Table 1300. A Walsh Code 5206 specifies the Walsh-Hadamard code number, and for a spreading factor (SF) <512, this Walsh Code 5206 number is most preferably $log_2(SF)$ bits, left justified and right filled with zeros. In this way, the Walsh Code 5206 number for SF=512 matches the same code number and code pattern of the other spreading factors.

Looking again at FIG. 53, the Walsh sub-task parameters for finger EOL and DPE tasks are seen to also include a Walsh disable bit 5302, that when set at "1", disables its associated Walsh sub-task. A Walsh Code field 5304 operates as described above with reference to FIG. 52 for Walsh sub-task parameters for non-EOL finger tasks. Setting a Coherent Option bit 5306 specifies that coherent processing for more than one symbol is selected (implies a pilot region); otherwise coherent processing is limited to one symbol, and energies are accumulated over many symbols (pilot or non-pilot region). A Processing Specifier field 5308 is used for multi-symbol coherent processing (pilot only). The Processing Specifier field 5308 allows for 1) coherent accumulations of longer than a single symbol, wherein $N_{TS}$ specifies the length of the coherent accumulation, as discussed herein before; and 2) single-symbol coherent processing (pilot or non-pilot), that allows for non-coherent accumulation of symbols and wherein $N_{TS}$ is ignored.

Figure 54:
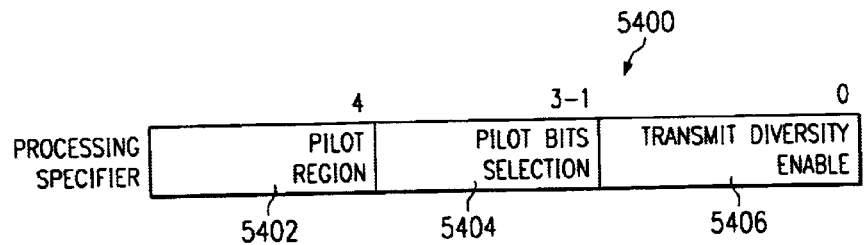
FIG. 54 illustrates a processing specifier for multi-symbol coherent processing.

FIG. 54 illustrates a more detailed diagram of a Processing Specifier field 5400 for multi-symbol coherent processing according to one preferred embodiment and that is suitable for use in association with the CCP 100. The Processing Specifier field 5400 is seen to have a Pilot Region bit 5402 that is used to specify one of two pilot regions specified in the "Pilot-TPC Position Table" discussed herein before with reference to FIG. 17. A Pilot Bits Selection field 5404 is used to select one of four options (values "1" through "4") in the Pilot Bits Table discussed above with reference to FIG. 18, or the common Pilot Channel (value "0"). A Transmit Diversity Enable bit 5406 is set at "1" to enable diversity pilot processing such that energies from two antennas are combined.

Figure 55:
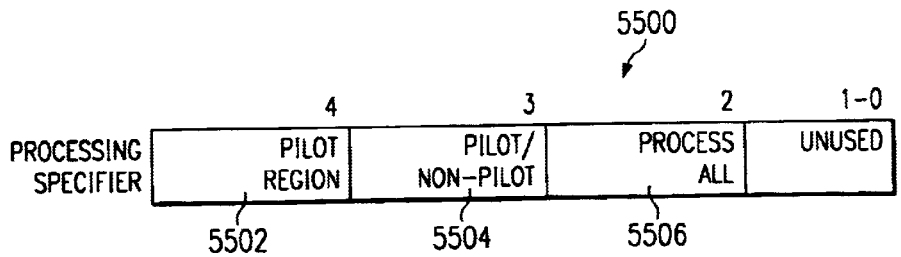
FIG. 55 illustrates a processing specifier for single-symbol coherent processing.

FIG. 55 illustrates a more detailed diagram of a Processing Specifier field 5500 for single-symbol coherent processing according to one preferred embodiment and that is suitable for use in association with the CCP 100. The Processing Specifier field 5500 can be seen to also have a Pilot Region bit 5502 to allow selection of one of two pilot regions specified in the "Pilot-TPC Position Table" discussed above. A Pilot/Non-Pilot bit 5504 is set at "1" to select the pilot region as defined by the Pilot Region bit 5502, or is otherwise set at "0" to select a region outside of the defined pilot region. Setting the Process All bit 5506 at "1" causes the Pilot/Non-Pilot bit 5504 to be ignored. All of the symbols in the slot are processed when the Process All bit 5506 is set at "1" and only the symbols in the region defined by the pilot region and the Pilot/Non-Pilot bit 5504 are process when the Process All bit 5506 is set at "0."

Figure 56:
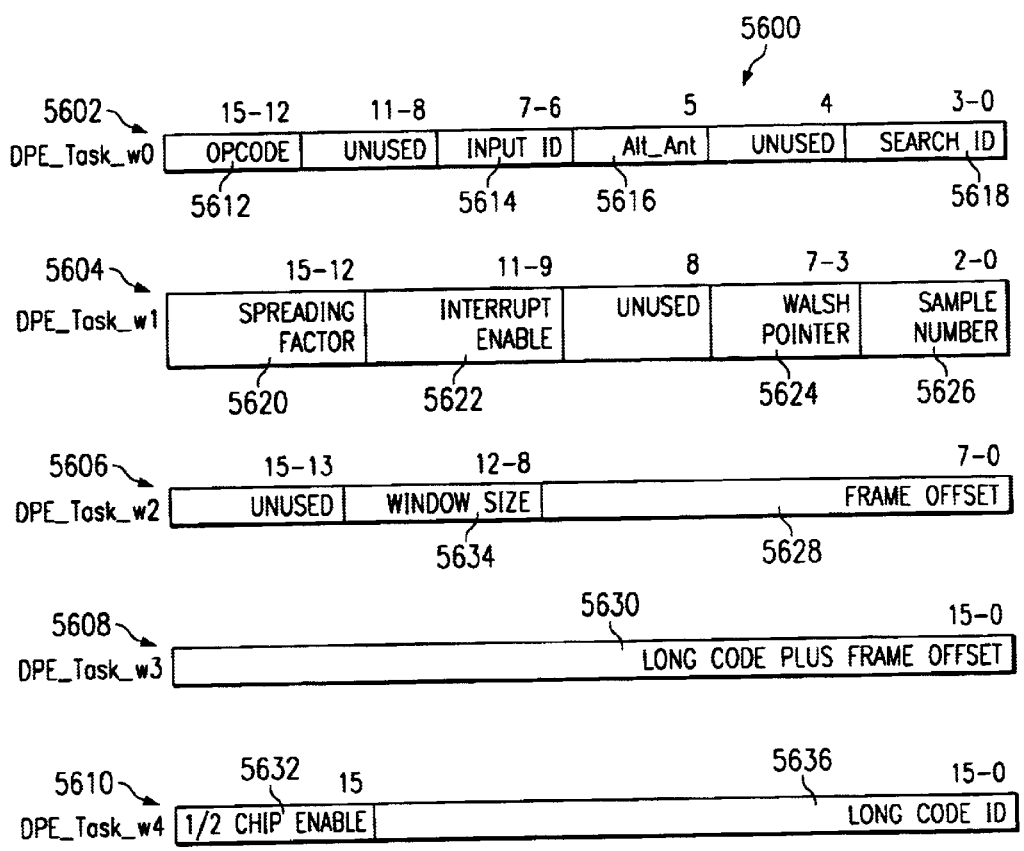
FIG. 56 illustrates a DPE search task format.

FIG. 56 illustrates one DPE search task format 5600 for several DPE search task parameters associated with DPE task registers 5602, 5604, 5606, 5608, and 5610 according to one preferred embodiment and that is suitable for use in association with the CCP 100. The DPE search measures path energies in a specified window of offsets. Two offsets are searched in each CCP cycle. It supports the determination of the strongest paths on any Walsh code channel (which may or may not be beam-formed). When two input antennas are present, an alternating antenna mode can be selected in. which alternate symbols are de-spread from alternate antennas. Results are stored in the DPE Buffer 114 discussed above. Each DPE search task has a unique DPE search ID to distinguish itself from other DPE tasks. The search ID controls where in the DPE Buffer 114 the results are stored. The search ID most preferably must not be changed while the DPE task is running, since erroneous results will likely occur for some embodiments of the CCP 100. The DPE search task operates in a one-shot mode, as stated herein before. When pilot symbols are accumulated coherently over multiple symbols, (specified by Coherent Option bit 5306="1" in the Walsh sub-task), $N_{TS}$ controls the number of radio time slots of coherent accumulation, and results are output $N_{TS}*N_{NTS}$ radio time slots after the start of the task. When symbol energies are accumulated, (specified by Coherent Option bit 5306="0" in the Walsh sub-task), $N_{TS}$ is ignored and results are output $N_{TS}$ radio time slots after the start of the task. The values for $N_{TS}$ and $N_{NTS}$ are read from the DPE Energy Accumulation Table referenced by the search ID and discussed herein before in association with FIG. 22. The DPE search, as stated above, is decimated by 4 when the spreading factor is 4, and decimated by 2 when the spreading factor is 8 (a limitation which applies only to DPCCH, not CPICH).

Looking again at FIG. 56, the DPE search task parameters are seen to include a task Opcode field 5612 (e.g., "0011") as well as an Input ID field 5614 that is used to select an input buffer within a plurality of Input Buffers 102. An Alt_Ant bit 5616 is used to select an alternating antenna mode from two input buffers within the plurality of Input Buffers 102. A DPE Search ID 5618 distinguishes different DPE tasks. A Spreading factor field 5620 for SF=4, 8, 16, 32, 64, 128, 256, or 512, is mapped in order bit values "000" through "111." An Interrupt Enable field 5622 is used to characterize interrupts, wherein the MSB enables an interrupt and the two LSB's specify a particular interrupt FIFO. A Walsh Pointer field 5624 is used to select a Walsh sub-task set, wherein the Walsh sub-task in the first location is used and further wherein the Walsh enable field of other sub-tasks are ignored thereby ignoring other Walsh sub-tasks. A Sample # field 5626 is used to select which sub-chip sample to be "ontime." A Frame Offset field 5628 within DPE task register 5606 is used to specify the offset of a frame with respect to the start of the Long Code. The Frame Offset is most preferably always a multiple of 256 chips, so the Frame Offset field 5628 specifies the multiple of 256 chips from the Long Code offset. The start of the frame most preferably always follows the start of the Long Code, so the Frame Offset field 5628 is specifying how much later (and is unsigned). A Long Code plus Frame Offset field 5630 is used to specify the offset, with respect to the global chip count, at which the frame begins, wherein the four MSB's specify the offset in radio time slots, while the remaining LSB's specify the additional sub-slot in chips. A ½-chip enable bit 5632 is used to enable processing of samples at ½-chip resolution. A Window Size field 5634 (5 bits), is used to specify a window size of 16*(n+1) relative to Long Code Offset, wherein 0≦n<31. A Long Code ID field 5636 is used to specify Gold code associated with long-code scrambling. According to one embodiment, the DPE search task requires a number of cycles equal to half the number of offsets in the window size, regardless of whether ½-chip processing is enabled.

Figure 57:
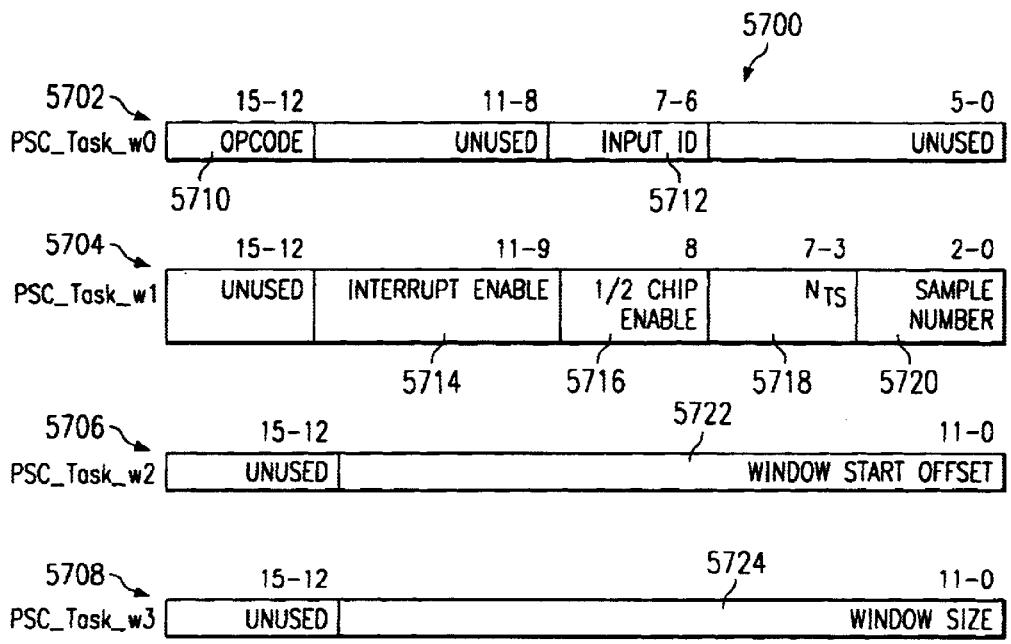
FIG. 57 illustrates a PSC search task format.

FIG. 57 illustrates one PSC search task format 5700 for several PSC search task parameters associated with PSC task registers 5702, 5704, 5706 and 5708 according to one preferred embodiment and that is suitable for use in association with the CCP 100. The PSC search task supports the locating of PSC in the WCDMA standard, which determines slot timing. The results are stored in the PSC Search Buffer 118 and can be read by the host processor once the task completes. In one embodiment, only one running PSC search task is allowed at any time, and it most preferably must be the first task to run in order for the post-processing hardware to have time to complete its processing, as stated herein before.

Looking again at FIG. 57, the PSC search parameters are seen to include a task Opcode field 5710 (e.g., "0001"). An Input ID field 5712 is used to select an input buffer from the plurality of Input Buffers 102. An Interrupt Enable field 5714 is used to characterize interrupts, wherein the MSB enables an interrupt and the two LSB's determine the interrupt FIFO. A ½-Chip En field 5716 is used to enable processing of samples at ½-chip resolution. An $N_{TS}$ field 5718 is used to specify a number of radio slots to accumulate energy. A Sample # field 5720 is used to select which sub-chip sample to be "ontime." A Window Start Offset field 5722 is used to specify a start time for the task in chips. A Window Size field 5724 is used to specify the number of chips to be included in the window. According to one embodiment, the PSC search task requires 16 cycles, wherein the task is activated when the GCC modulo 2560 is equal to the value specified in the Window Start Offset field 5722.

Figure 58:
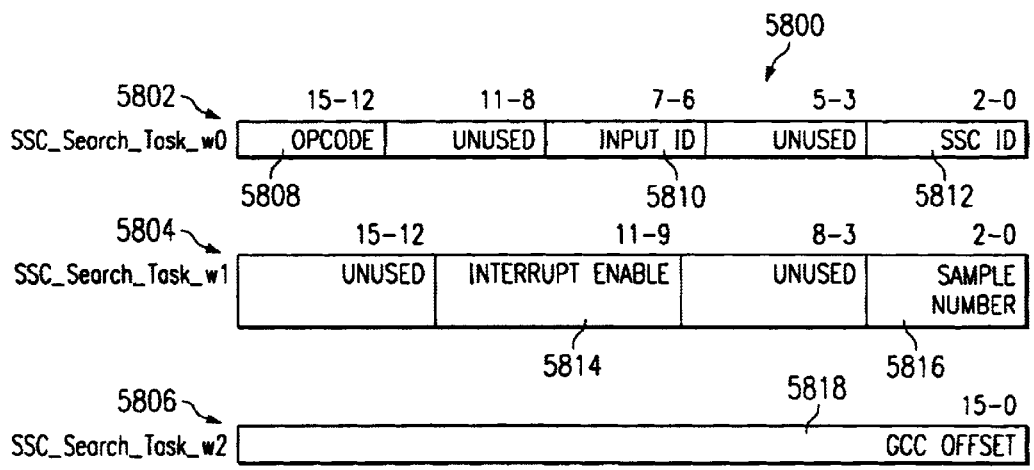
FIG. 58 illustrates a SSC search task format.

FIG. 58 illustrates one SSC search task format 5800 for several SSC search task parameters associated with SSC task registers 5802, 5804 and 5806 according to one preferred embodiment and that is suitable for use in association with the CCP 100. The SSC search task performs part of the stage-2 WCDMA base-station search discussed herein before. It operates only on the masked-out symbol of a Perch channel and outputs 16 symbols de-spread by the SSC (of 16-chip length), as well as 16 symbols de-spread by the PSC, per radio time slot. In this way, the SSC search task operates similarly to a finger task. The remaining stage-2 processing, including applying the second level of SSC coding, the Walsh-Hadamard transform, and matched-filtering with Comma-free code, takes place in the host processor or in hardware outside of the CCP 100, as stated herein before. The masked-out symbol location is specified in the Search Code Symbol Location register discussed herein above with reference to FIG. 23. The SSC search task most preferably uses a SSC ID that is unique to any other SSC search tasks and does not use a Walsh Pointer for data processing. The resulting SSC and PSC are placed in a four slot circular buffer within the SSC Buffer 140 discussed herein before in association with FIG. 47, wherein the SSC search activates an end-of-slot interrupt when a complete slot of data is ready in the SSC Buffer 140. The SSC search task starts and stops as discussed herein above with reference to FIG. 49.

With continued reference to FIG. 58, the SSC search task parameters are seen to include an Opcode field 5808 (e.g., "0101") as well as an Input ID field 5810 that is used to select an input buffer from the plurality of Input Buffers 102. A SSC ID field 5812 is a user defined field that is a unique identification number for all SSC tasks. An Interrupt Enable field 5814 utilizes the MSB to enable an end-of-slot interrupt and the two remaining LSB's specify a particular interrupt FIFO. A Sample # field 5816 is used to select which sub-chip sample to be "ontime." The GCC Offset field 5818 causes the "frame" timing to be like a finger with LC Offset=GCC Offset and Frame Offset=0. Frame timing for SSC search, is however, arbitrary since the purpose of SSC search is to establish frame timing. Having a specific "frame" time does allow the SSC Buffer 140 and associated SW to have some time reference in relation to the new frame timing that will be established. In a manner similar to the DPE search task, the four MSB's specify the offset in radio time slots while the remaining LSB's specify the additional sub-slot offset in chips.

Figure 59:
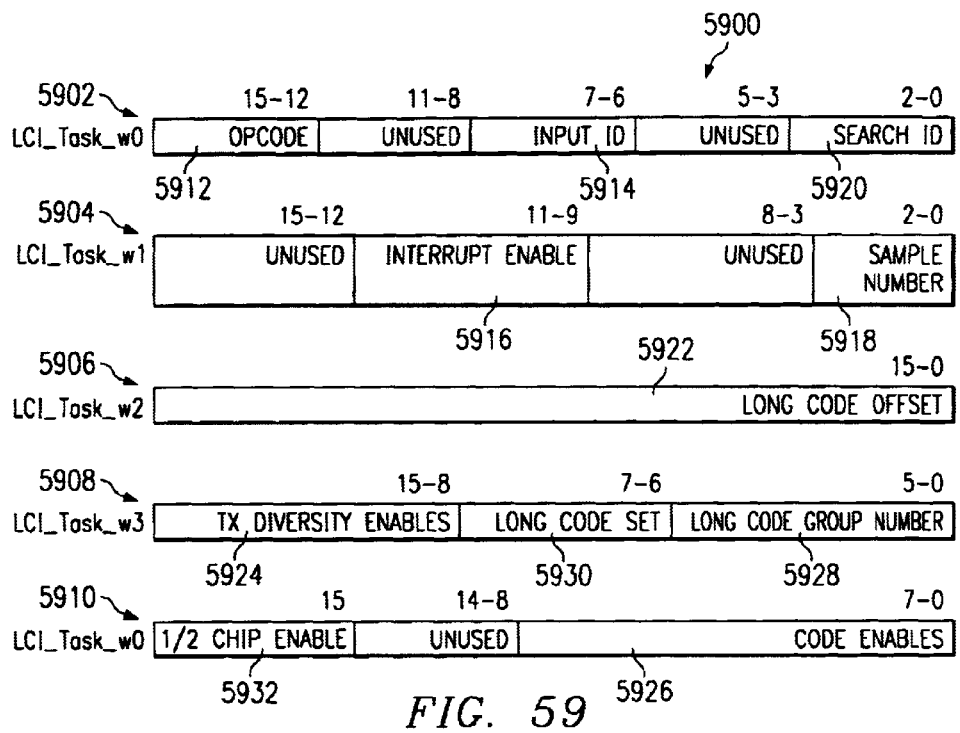
FIG. 59 illustrates a LCI search task format.

FIG. 59 illustrates one LCI search task format 5900 for several LCI search task parameters associated with LCI task registers 5902, 5904, 5906, 5908 and 5910 according to one preferred embodiment and that is suitable for use in association with the CCP 100. The LCI search task supports the determination of the long code from a group of long codes ("stage 3 search") which were determined in "stage 2 search" by processing the CPICH. The results are stored in the LCI Buffer 115. Each LCI search task has a unique LCI search ID to distinguish itself from other LCI tasks. The LCI search ID controls where in the LCI Buffer 115 the results are stored. Most preferably, this search ID must not be changed or altered in any way while the LCI task is running, otherwise erroneous results likely will occur in association with various embodiments of the CCP 100. As stated herein before, the LCI search task operates in one-shot mode. Following the start of the LCI search task, pilot symbols are accumulated coherently over multiple symbols, whereas $N_{TS}$ controls the number of radio time slots of coherent accumulation and results are output $N_{TS}*N_{NTS}$ radio time slots. The values for $N_{TS}$ and $N_{NTS}$ are read from the LCI Energy Accumulation Table as discussed herein above in association with FIG. 22 and referenced by the search ID. The LCI search task most preferably always processes the Common Pilot Channel and antenna diversity is an option.

Looking again at FIG. 59, the LCI search task parameters can be seen to include a task Opcode 5912 (e.g., "0010") as well as an Input ID 5914 that is used to select an input buffer from among the plurality of Input Buffers 102. The LCI search task is seen to also include an Interrupt Enable field 5916 that is used to characterize interrupts wherein the MSB enables an interrupt and the two LSB's are used to specify a specific interrupt FIFO. A Sample # field 5918 is used to select a specific sub-chip sample to be "ontime" and a Search ID field 5920 is used to distinguish among different LCI tasks. The LCI task register 5906 contains a Long Code Offset field 5922 that is used to specify the offset of long code start with respect to the global chip count, wherein the four MSB's specify the offset in radio time slots, and the remaining LSB's specify the additional sub-slot offset in chips. A Transmit (TX) Diversity Enables field 5924 specifies the transmit diversity for each of the long codes to be tested. According to one preferred embodiment a "1" is used to enable diversity pilot processing such that energies from two antennas are combined, wherein the bits correspond to the Code Enables field 5926 bits. A Long Code Group Number field 5928 is used to specify which group of 64 code groups, each having 8 long codes, to process and test. A Long Code Set field 5930 specifies the main code set (e.g., "00"), the even alternative set (e.g., "01"), or the odd alternative set (e.g., "10"). A ½-chip enable bit 5932 is preferably set at "1" to enable processing of ½-chip late samples. A Code Enables field 5926 specifies which of the 8 long codes to test, wherein a single bit enables the testing of each long code (e.g., bit 7 for code 7 . . . down to bit 0 for code 0) and a single bit is preferably set at "1" to indicate the code should be tested. According to one embodiment, completion of the LCI search task requires a number of cycles equal to the number of long codes to be tested.

Figure 60:
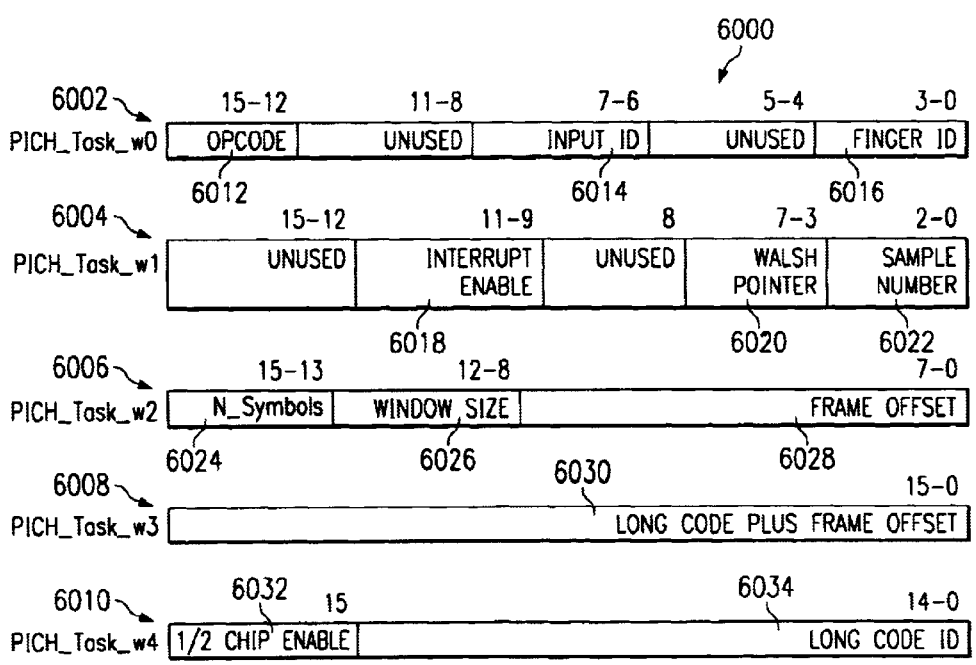
FIG. 60 illustrates a PICH search task format.

FIG. 60 illustrates one paging indication channel (PICH) search task format 6000 for several PICH search task parameters associated with PICH task registers 6002, 6004, 6006, 6008 and 6010 according to one preferred embodiment and that is suitable for use in association with the CCP 100. The PICH search task de-spreads symbols in a specified window of offsets at ½-chip resolution. Results are stored in the Finger Symbol Buffer 106 according to the finger ID used, and the Walsh ID pointed to by the Walsh Pointer described above in association with FIG. 13. Each PICH task has a unique finger ID to distinguish itself from other PICH and finger tasks. Resulting data is placed in the Finger Symbol Buffer 106 (described in further detail herein below), starting from the location determined by the FSB Configuration Table 1500 ping entry for the Finger/Walsh ID combination. The symbols are stored for the first window offset "ontime" (1–8 symbols) followed by the first window offset "late-time" (1–8 symbols), followed by the second window offset "ontime" (1–8 symbols), and so on. If fewer than 8 symbols are requested, space is left for the missing symbols in the FSB 106, but the data space is undefined. As stated above, the PICH search task operates in one-shot mode for 1–8 symbols in association with a spreading factor of 256.

Continuing now with FIG. 60, the Paging Indication Channel (PICH) De-spreading (search) task parameters can be seen to include a task Opcode 6012 (e.g., "0111") as well as an Input ID 6014 that is used to select an input buffer from among the plurality of Input Buffers 102. The PICH search task is seen to also include an Interrupt Enable field 6018 that is used to characterize interrupts wherein the MSB enables an interrupt and the two LSB's are used to specify a particular interrupt FIFO. A Walsh Pointer field 602 selects a particular Walsh sub-task set in which the Walsh sub-task in the first location is used while others are ignored along with any associated Walsh sub-task enable field. A Sample # field 6022 is used to select a specific sub-chip sample to be "ontime" and a Finger ID field 6016 is used to distinguish among different finger and PICH tasks. The N_Symbols field 6024 determines the number of symbols for the instruction to process ("000" through "111" indicate 1 through 8 according to one embodiment). A Frame Offset field 6028 within PICH task register 6006 is used to specify the offset of a frame with respect to the start of the Long Code. Most preferably, this is always a multiple of 256 chips, wherein the field 6028 specifies the multiple of 256 chips from the Long Code offset. The start of the frame most preferably always follows the start of the Long Code such that the field 6028 is specifying how much later (preferably unsigned). The PICH task register 6008 contains a Long Code plus Frame Offset field 6030 that is used to specify the offset with respect to the global chip count at which the frame begins, wherein the four MSB's specify the offset in radio time slots, and the remaining LSB's specify the additional sub-slot offset in chips. A ½-chip enable bit 6032 is used to enable processing of samples at ½-chip resolution. A Window Size field 6026 (5-bits) is used to specify a window size of 16*(n+1) relative to Long Code Offset, wherein n is equal to or greater than 0, but less than 31. Finally, a Long Code ID field 6034 specifies Gold code used to accommodate long-code scrambling. According to one embodiment, completion of the PICH search task requires a number of cycles equal to the number of offsets in the window size, regardless of whether ½-chip processing is enabled.

Figure 61:
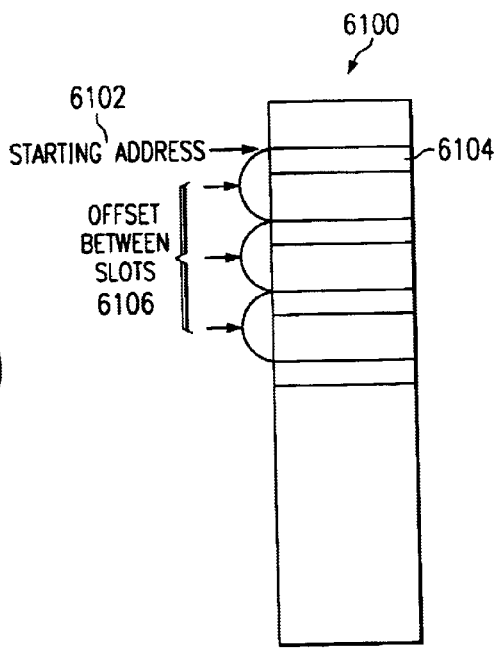
FIG. 61 illustrates a circular buffer within a finger symbol buffer.

FIG. 61 illustrates one embodiment of a circular buffer 6100 within the Finger Symbol Buffer 106. As stated above, the Finger Symbol Buffer 106 stores complex I and Q symbols that result from finger tasks. All symbols, including pilot, TPC, data, and the like, are stored in the Finger Symbol Buffer 106 after they are received and processed by the CCP 100 Data Path 300. The Finger Symbol Buffer 106 is implemented as many multi-slot circular buffers 6100. The Finger Symbol Buffer 160 according to one embodiment is implemented such that a total of 20 K (twenty-thousand) complex symbols (32-bits/symbol) can be stored at spreading factors from 8 to 512, or 40 K (forty-thousand) complex symbols (16-bits/symbol) can be stored at spreading factor 4. Each Walsh channel of each finger most preferably uses a different circular buffer 6100 to store symbols in order to minimize the reconfiguration of symbol buffering when fingers or Walsh channels are added and removed. According to one embodiment described above, the total size of the FSB 106 is 20 K×32-bit words. Each finger ID/Walsh ID combination preferably specifies a multi-slot circular buffer 6100 in the FSB 106 that will be used to store its data, wherein each slot 6104 has a starting address 6102 such that one or more offsets 6106 can be defined between the starting addresses 6102 associated with the slots 6104. This feature allows Walsh channels for the same finger task to be placed adjacent to one another on a slot by slot basis. According to one embodiment, the host processor (e.g., DSP) is responsible to ensure that there is no overlap between buffers 6100 for a single finger ID/Walsh ID combination and between different finger ID/Walsh ID combinations. Each circular buffer 6100 is most preferably four radio slots long. Most preferably, the starting slot for data when an instruction is started is determined by hardware, and must be read by software to maintain synchronization due to the four slot circular buffer in combination with a 15 radio slots per frame requirement. According to one embodiment, a super-frame count from 0 to 3 is kept as an adjunct to GCC to provide a reference to the hardware in determining which FSB slot 6104 in the circular buffer 6100 in which to place data.

The FSB Configuration Table 1500 is used to assign the despreader data associated with a particular finger ID and Walsh ID to a particular circular buffer 6100. The Finger Symbol Buffer 106 also serves as intermediate storage for downstream symbol processing, and is accessible on both the DSP Bus 104 and the FSB External Bus 108 to facilitate symbol processing in hardware and/or software as stated herein before. The DSP Bus 104 allows access by the host processor either directly or via DMA; while the FSB External Bus 108 access allows downstream hardware to directly access finger data.

Looking again at FIGS. 1 and 5, there are six interrupt lines 170 from the CCP 100 that are connected to an internal interrupt generator 165 as discussed above. There are four general-purpose interrupts that come from four FIFO's described herein before with reference to FIGS. 32–39. The remaining two interrupts are comprised of a system interrupt and an error interrupt. Each of the four Interrupt FIFO's (registers) contains interrupt-event information that comes from CCP tasks. A finger task, for example, can trigger multiple interrupt events that may be mapped to a particular interrupt FIFO. Preferably, each FIFO may store up to $N_{intFIFO}$=16 task-based interrupt events, wherein reading the FIFO by the host processor decrements the number of contained events. A FIFO is used to accommodate many interrupt events triggered by CCP tasks, and allows the host processor to optimize the servicing of CCP interrupts. As discussed above, each task may map its interrupt events to any interrupt FIFO using the Finger Interrupt Table 1002 and/or the Interrupt Enable field in the task specification described herein with reference to FIGS. 56–60. Finger interrupt events that may be mapped to interrupt FIFO's using the Finger Interrupt Table 1002 include a pilot interrupt event, TPC interrupt event, and slot interrupt event. The foregoing interrupt events most preferably can be mapped to any FIFO, including the same FIFO. According to one embodiment, all other tasks can trigger one task-based interrupt event each that is enabled and mapped to a FIFO using the above described Interrupt Enable field. When a task event occurs, a task opcode, task ID, finger task interrupt events data, and GCC data is written into a FIFO to formulate one FIFO entry that can be accessed by the host processor on the DSP Bus 104 using two read accesses. Interrupt events data, according to one embodiment, applies only to finger tasks, and is used to specify the particular finger task based events. When multiple finger interrupt events occur in the same CCP cycle, a maximum of one FIFO entry is logged to any given FIFO. This field therefore indicates not only which one of the events, but which combination of events. For one embodiment, the GCC is preferably implemented at a resolution of 16 chips, and an attempt to read an empty FIFO will return all zeros on the data bus. As task events occur, their status data are immediately entered into the FIFO that is mapped. These entries however, cannot be read until the next 16-chip boundary at which time the task events also activate the requisite FIFO non-empty status field. Many entries may be written to a FIFO in a single CCP iteration, but these entries cannot be read until the next 16-chip boundary.

In addition to the above general purpose interrupt events, a Task_Update Interrupt event such as discussed above with reference to FIG. 48 as well as Error Interrupt events including, but not necessarily limited to, number of allowed cycles exceeded and FIFO overflow (4-bits) are accommodated by the CCP 100. The external interrupts are activated when the interrupt events mapped to them are activated. Activation timing for interrupt events according to one preferred embodiment is as follows:

1) A FIFO (non-empty) event occurs in which the non-empty status of a FIFO is only activated at the next 16-chip boundary following the CCP cycle where the task-based event occurs. Although the task event information is entered into the FIFO when the task-based event occurs, this new entry cannot be read until the next 16-chip boundary and does not affect the FIFO's non-empty status;

2) A system interrupt event occurs in which the Task_Update interrupt event occurs at the Task_Update boundary, and wherein the Task_Update boundary always resides on a 16-chip boundary; and 3) An Error interrupt event is activated upon occurrence of a defined system error. Any external interrupt is preferably cleared when all of the interrupt events that are mapped to it are cleared, such as by 1) reading out by the host processor of all FIFO entries, 2) reading of the System Interrupt Event Status register by the host processor, and 3) reading of the Error Interrupt Event Status register by the host processor.

In summary explanation of the above, the present invention is programmable, highly flexible, vector-based correlator co-processor (CCP 100) that performs CDMA base-station and handset RAKE receiver operations for multiple channels. Because most RAKE receiver functions involve correlations and accumulations, regardless of the particular wireless protocol, a centralized correlation machine can be used for various RAKE receiver tasks like finger de-spreading and search. The CCP 100, in addition to performing correlations (complex valued), which consist of de-spreading and coherent accumulation, also accumulates "symbol" energy values (non-coherent accumulations). When used in a base station setting, the CCP 100 can receive and process multiple I and Q samples from at least 18 antenna sources. The CCP 100 performs chip-rate processing and energy accumulation according to the tasks that a host processor, e.g. DSP, writes to the CCP Task Buffers 180 to control the CCP 100 operations. Exemplary host processors suitable for use with the CCP 100 include the TMS320C641x/C55x DSPs manufactured by Texas Instruments Incorporated of Dallas, Texas. The TMS320C641x/C55x DSPs perform all symbol-rate receiver operations such as channel estimation (including phase and frequency estimation), de-interleaving, feedback loops such as Automatic Gain Control, and Delay Locked Loop.

Figure 62:
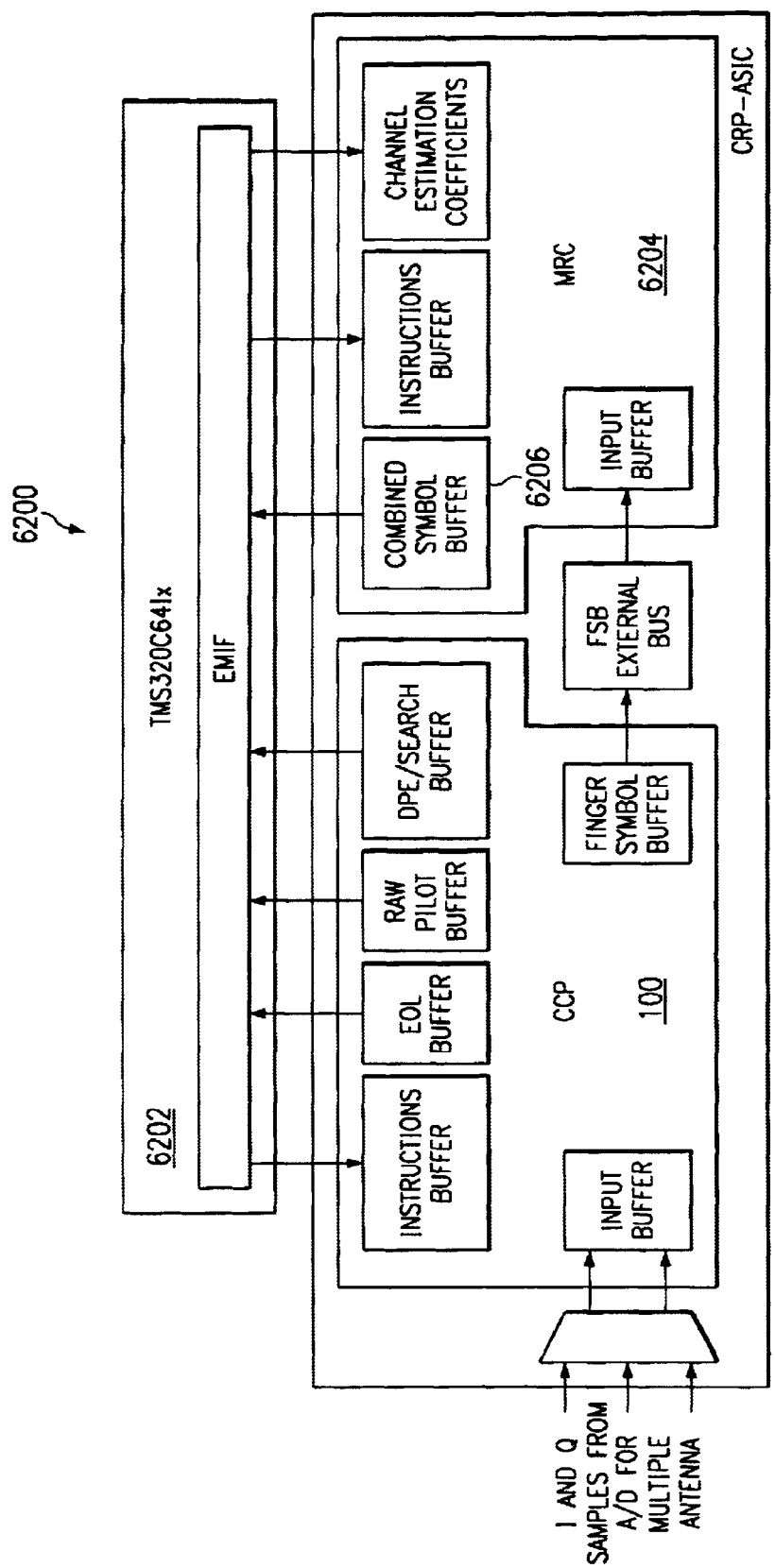
FIG. 62 illustrates implementation of a digital base-band system comprising the CCP shown in FIG. 1, a digital signal processor (DSP), and a maximal-ratio combining (MRC) ASIC according to one embodiment of the present invention.

FIG. 62 illustrates implementation of a digital base-band system 6200 comprising the CCP 100, a TMS320C641x DSP 6202, and a maximal-ratio combining (MRC) ASIC 6204. The MRC function can alternatively be implemented in software. The CCP 100 is responsible for 1) performing the de-spreading necessary to provide data symbols per finger to the entity (e.g. DSP or another ASIC), in charge of the MRC processing, 2) performing EOL energy measurements for a DLL, 3) performing on-chip and ½-chip correlations and energy measurements for DPE and search purposes, and 4) providing raw pilot symbols per finger to the (C6x/C55x) DSP 6202. The (C6x/C55x) DSP 6202 uses the computed raw pilot symbols to perform the channel estimation of each finger. Coefficients of the channel estimation are then sent to the entity in charge of the MRC processing, e.g. MRC ASIC 6204 or (C6x/C55x) DSP 6202. Using those computed coefficients, the MRC ASIC 6204 multiplies de-spread symbols with the channel estimation coefficients and then sums the symbols coming from various fingers (paths) together to provide combined symbols in the Combined Symbol Buffer (CSB) 6206.

Figure 63:
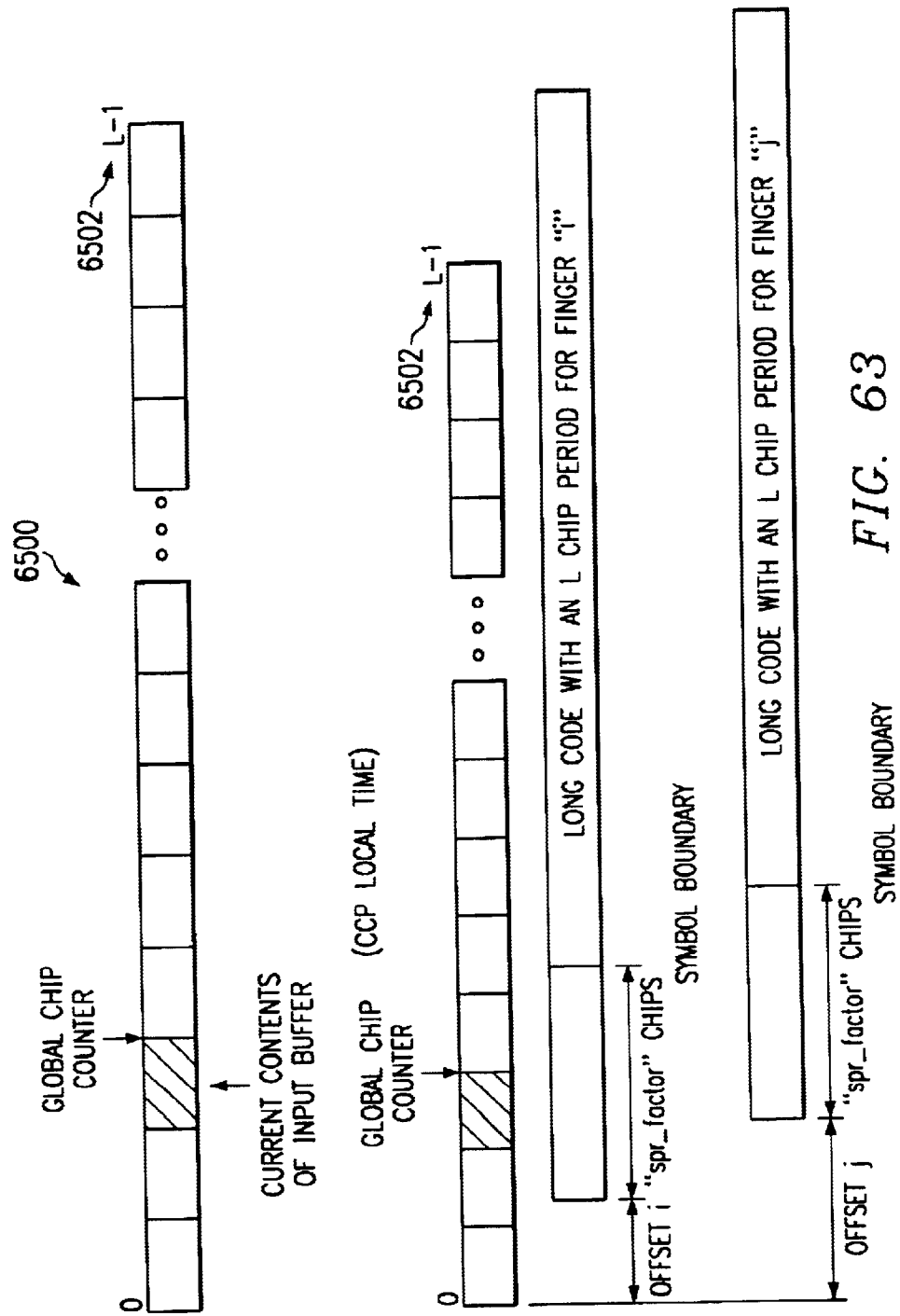
FIG. 63 illustrates a global chip counter (GCC) mechanism for maintaining timing in a CDMA rake receiver and that is suitable for use in association with the CCP shown in FIG. 1.

FIG. 63 illustrates a global chip counter (GCC) mechanism 6500 for maintaining timing in a CDMA rake receiver and that is suitable for use in association with the CCP 100 according to one embodiment of the present invention. A CDMA receiver keeps track of timing between various multipath components. The multipath timing is determined using a path search or delay profile estimation function familiar to those skilled in the CDMA rake receiver art. The strongest multipath components are assigned to RAKE "fingers" that perform a de-spreading operation on each multipath component. The GCC 6500 is a hardware counter that counts incoming CDMA signal samples (or "chips"). The GCC 6500 counts modulo the period "L" 6502 of the pseudo-noise (PN) sequence used to spread the CDMA signal. It counts the samples of the CDMA signal ("chips") as they arrive at the receiver and are written into an Input Buffer 102. All timing in the receiver is specified relative to the GCC 6500. A searcher provides path timing, also relative to the GCC 6500. These path timings may then be transferred to RAKE fingers. In the event that the finger allocation is performed in software, the software process does not need to know the precise timing in the hardware. The path timings are specified relative to GCC 6500, and the hardware can compute the precise timing by adding the relative timing value to the current value of GCC 6500. As stated herein before, all timing in the CCP 100 is relative to the GCC 6500, including the searcher and RAKE finger offsets.

This invention has been described in considerable detail in order to provide those skilled in the wireless communication art with the information need to apply the novel principles and to construct and use such specialized components as are required. In view of the foregoing descriptions, it should be apparent that the present invention represents a significant departure from the prior art in construction and operation. However, while particular embodiments of the present invention have been described in detail herein, it is to be understood that various alterations, modifications and substitutions can be made therein without departing in any way from the spirit and scope of the present invention, as defined in the claims which follow. For example, although certain CCP 100 capabilities and architectures have been defined above in association with a 3.84 chip rate, the basic architecture concept of the CCP 100 would remain the same for other chip rates. Further, although the CCP 100 has been described herein to determine correlation between input data and locally generated PN sequence(s), other embodiments of the CCP 100 can just as well be utilized to generate cross-correlation of two locally generated PN sequences. Such cross-correlation values may be used by a host processor such as a DSP to perform IC/MUD in software.

What is claimed is:

1. A correlator co-processor (CCP) for a wireless communication system comprising:

a pseudo-noise (PN) code generator for generating PN codes;

a Walsh code generator for generating Walsh codes;

at least one input buffer configured to receive and store in-phase and quadrature phase (I/Q) sub-chip samples;

at least one chip counter (GCC) configured to count chip samples received by the at least one input buffer and count modulo a WCDMA long code length and further configured as a local timing reference for the CCP;

a data path configured to receive and process samples of the PN codes, samples of the Walsh codes and the I/Q sub-chip samples;

at least one task buffer configured to store a list of programmably executable tasks;

at least one configuration table buffer in communication with the at least one task buffer and configured to store a plurality of configuration tables that specify how each task within the list of programmably executable tasks is implemented;

an interrupt generator;

at least one output data buffer; and a controller in communication with the data path, the at least one task buffer, the at least one configuration table, the interrupt generator, the PN code generator, the Walsh code generator, the GCC and the at least one output buffer, such that the controller, synchronized with timing signals received from the GCC and directed by the programmably executable tasks, can direct the Walsh code generator to generate the Walsh codes, can direct the PN code generator to generate the PN codes and can direct the data path to process the samples of the PN codes, the samples of the Walsh codes and the I/Q sub-chip samples and therefrom selectively generate RAKE receiver data or search results, store the RAKE receiver data or search results in the at least one output data buffer, and cause the interrupt generator to generate at least one task-based interrupt signal.

2. The correlator co-processor (CCP) according to claim 1 wherein the data path comprises a plurality of multipliers configured to multiply the I/Q samples from the at least one input buffer with samples of the PN codes and samples of the Walsh codes.

3. The correlator co-processor (CCP) according to claim 2 wherein the data path further comprises a plurality of adder trees configured to generate partial correlation data associated with the I/Q samples.

4. The correlator co-processor (CCP) according to claim 3 wherein the data path further comprises at least one coherent accumulator configured to sum the partial correlation data with data associated with at least one previous partial correlation associated with the I/Q samples.

5. The correlator co-processor (CCP) according to claim 4 wherein the data path further comprises a post-processing element configured to generate energy data and execute non-coherent accumulations associated with the I/Q chip samples.

6. The correlator co-processor (CCP) according to claim 5 wherein the data path further comprises temporary memory elements configured to store at least some of the partial correlation data, energy data and intermediate accumulation data associated with the non-coherent accumulations.

7. The correlator co-processor (CCP) according to claim 6 wherein the data path further comprises a plurality of pipeline stages configured to maximize processing capability.

8. The correlator co-processor (CCP) according to claim 1 wherein at least one output data buffer comprises at least one buffer selected from the group consisting of primary search code (PSC), delay profile estimation (DPE), long code identifier (LCI), secondary search code (SSC), Finger Max, early-ontime-late (EOL), and Finger Symbol buffers.

9. The correlator co-processor (CCP) according to claim 8 further comprising a Finger Symbol buffer (FSB) external bus capable of providing an external host processor access to FSB data.

10. The correlator co-processor (CCP) according to claim 1 wherein the controller, directed by the programmably executable tasks, is configured to further cause the interrupt generator to generate system interrupts to indicate global CCP events and error interrupts to indicate detection of error conditions.

11. The correlator co-processor (CCP) according to claim 1 further comprising an external system interface bus capable of providing an external host processor access to the at least one configuration table buffer, the interrupt generator and the at least one output data buffer.

12. The correlator co-processor (CCP) according to claim 11 wherein the external system interface bus is a RHEA bus.

13. The correlator co-processor (CCP) according to claim 11 wherein the external system interface bus in a EMIF bus.

14. A correlator co-processor (CCP) for a RAKE receiver comprising:

means for generating pseudo-noise (PN) codes;

means for generating Walsh codes;

means for receiving and storing in-phase and quadrature (I/Q) sub-chip samples;

timing means for counting chip samples received by the receiving and storing means;

data processing means for processing samples of the PN codes, samples of the Walsh codes and the I/Q sub-chip samples;

means for storing a plurality of programmably executable tasks;

means for storing a plurality of configuration tables;

means for generating interrupt signals;

means for storing output data; and controlling means in communication with the data processing means, task storing means, configuration table storing means, interrupt generating means, PN code generating means, Walsh code generating means, timing means and output data storing means, such that the controlling means, directed by the programmably executable tasks, can direct the data processing means to process the samples of the PN codes, the samples of the Walsh codes and the I/Q sub-chip samples, and therefrom generate RAKE receiver data.

15. The correlator co-processor (CCP) according to claim 14 wherein the controlling means, directed by the programmably executable tasks can further cause the interrupt generating means to generate at least one task-based interrupt signal.

16. The correlator co-processor (CCP) according to claim 14 wherein the data processing means comprises multiplying means for multiplying the I/Q samples associated with the receiving and storing means with samples of the PN codes and samples of the Walsh codes.

17. The correlator co-processor (CCP) according to 16 wherein the data processing means further comprises adding means for generating partial correlation data associated with the I/Q samples.

18. The correlator co-processor (CCP) according to claim 17 wherein the data processing means further comprises coherent accumulating means for summing the partial correlation data with data associated with at least one previous partial correlation.

19. The correlator co-processor (CCP) according to claim 18 wherein the data processing means further comprises post-processing means for generating energy data and executing non-coherent accumulations associated with the I/Q sub-chip samples.

20. The correlator co-processor (CCP) according to claim 19 wherein the data processing means further comprises temporary storing means for storing at least some of the partial correlation data, energy data and non-coherent accumulation data.

21. The correlator co-processor (CCP) according to claim 14 wherein the means for storing output data comprises at least one buffer selected from the group consisting of primary search code (PSC), delay profile estimation (DPE), long code identifier (LCI), secondary search code (SSC), Finger Max, early-ontime-late (EOL), and Finger Symbol buffers.

22. The correlator co-processor (CCP) according to claim 21 further comprising means for providing a host processor direct access to data stored in the Finger Symbol buffer (FSB).

23. The correlator co-processor (CCP) according to claim 14 wherein the controlling means, directed by the programmably executable tasks, is configured to further cause the means for generating interrupt signals to generate system interrupts indicative of global CCP events and to generate error interrupts indicative of error conditions.

24. The correlator co-processor (CCP) according to claim 14 further comprising means for interfacing the CCP with RHEA bus compatible digital signal processors.

25. The correlator co-processor (CCP) according to claim 14 further comprising means for interfacing the CCP with EMIF bus compatible digital signal processors.

26. A correlator co-processor (CCP) for a RAKE receiver comprising:
- a pseudo-noise (PN) code generator having a control input and a PN code output;
- a Walsh code generator having a control input and a Walsh code output;
- at least one input buffer, each input buffer having at least one in-phase and quadrature (I/Q) signal sample input, a control input, and a complex signal output;
- at least one chip counter (GCC), each GCC having a signal sample input in communication with the at least one I/Q signal sample input and further having a local reference clock output;
- a data path having at least one output, a first data path input in communication with the PN code output and the Walsh code output, a second data path input in communication with the complex signal output, and further having a third data path input;
- at least one task buffer having an input and an output and configured to store a list of programmably executable tasks;
- at least one configuration table buffer having a first output and a second output, the first output in communication with the at least one task buffer input, and further having at least one input in communication with an external system interface bus;
- an interrupt generator having an input, a first output and a second output, the second output in communication with the external system interface bus;
- at least one output data buffer having at least one input in communication with the at least one data path output, and further having at least one output in communication with the external system interface bus; and
- a controller synchronized with the local reference clock output and having a first output in communication with the third data path input, a second output in communication with the PN code generator control input, the Walsh code generator control input and the input buffer control input, a third output in communication with the interrupt generator input, a first input in communication with the at least one task buffer output, and a second input in communication with the at least one configuration table second output.

27. The correlator co-processor (CCP) according to claim 26 wherein at least one output data buffer is a finger symbol buffer.

28. The correlator co-processor (CCP) according to claim 27 wherein the finger symbol buffer comprises an external communication bus interface output.

29. The correlator co-processor (CCP) according to claim 26 wherein the at least one output data buffer comprises at least one buffer selected from the group consisting of primary search code (PSC), delay profile estimation (DPE), long code identifier (LCI), secondary search code (SSC), finger max, early-ontime-late (EOL), and finger symbol buffers.

30. The correlator co-processor (CCP) according to claim 26 wherein the data path comprises a plurality of multipliers, a plurality of adder trees, at least one coherent accumulator, a post-processing element, and temporary data storage elements such that the data path can perform predetermined functions for a RAKE receiver.

31. The correlator co-processor (CCP) according to claim 30 wherein the predetermined functions are selected from the group consisting of de-spreading tasks, early/late correlations for time tracking, coherent accumulation of different lengths, energy estimation, non-coherent accumulation, correlations for delay profile estimation, and correlations for search/acquisition functions.

32. The correlator co-processor (CCP) according to claim 26 wherein the external system interface bus is a RHEA communication system bus.

33. The correlator co-processor (CCP) according to claim 26 wherein the external system interface bus is a EMIF communication system bus.

* * * * *